(12) United States Patent
Micko et al.

(10) Patent No.: US 10,739,190 B2
(45) Date of Patent: Aug. 11, 2020

(54) MOTION SENSOR USING LINEAR ARRAY OF INFRARED DETECTORS

(71) Applicant: Greenwave Systems PTE. LTD., Singapore (SG)

(72) Inventors: Eric Scott Micko, Singapore (SG); Fu Kin Fong, Hong Kong (HK)

(*) Notice: Subject to any disclaimer, the term of this patent is extended or adjusted under 35 U.S.C. 154(b) by 105 days.

(21) Appl. No.: 16/051,394

(22) Filed: Jul. 31, 2018

(65) Prior Publication Data
US 2018/0335342 A1 Nov. 22, 2018

Related U.S. Application Data

(63) Continuation of application No. PCT/US2017/016106, filed on Feb. 2, 2017.
(Continued)

(51) Int. Cl.
*G01J 1/42* (2006.01)
*G01J 1/44* (2006.01)
(Continued)

(52) U.S. Cl.
CPC .......... *G01J 1/4228* (2013.01); *G01J 1/0266* (2013.01); *G01J 1/44* (2013.01); *G01J 5/10* (2013.01); *G06F 3/0308* (2013.01); *G08B 13/191* (2013.01); *G08B 29/185* (2013.01); *G01J 2005/106* (2013.01)

(58) Field of Classification Search
CPC .......... G01J 1/4228; G01J 1/0266; G01J 5/10; G01J 1/44; G01J 2005/106; G06F 3/0308; G08B 13/191; G08B 29/185
See application file for complete search history.

(56) References Cited

U.S. PATENT DOCUMENTS

| | | |
|---|---|---|
| 4,614,938 A | 9/1986 | Weitman |
| 4,618,854 A | 10/1986 | Miyake et al. |

(Continued)

FOREIGN PATENT DOCUMENTS

| | | |
|---|---|---|
| CN | 2255673 | 6/1997 |
| CN | 100565139 | 12/2009 |

(Continued)

OTHER PUBLICATIONS

US 9,905,121 B2, 02/2018, Micko (withdrawn)
(Continued)

*Primary Examiner* — Michael C Bryant
(74) *Attorney, Agent, or Firm* — Young's Patent Services; Bruce A Young

(57) ABSTRACT

A motion sensor includes an infrared detector having a single linear array of at least four detector elements disposed on a substrate. The motion sensor also includes an optical system to simultaneously direct electromagnetic energy from two or more curtains of monitored volumes onto the linear array of detector elements. The two or more curtains of the monitored volumes having a tilt angle from a vertical orientation of the motion sensor to create a quadrature horizontal spatial relationship between the monitored volumes. Signals from the linear array of detector elements are then processed to detect a quadrature phase relationship between the signals, and an indication of human presence is provided if a quadrature phase relationship is found.

15 Claims, 7 Drawing Sheets

Related U.S. Application Data

(60) Provisional application No. 62/290,923, filed on Feb. 3, 2016.

(51) Int. Cl.
| | |
|---|---|
| *G01J 5/10* | (2006.01) |
| *G01J 1/02* | (2006.01) |
| *G06F 3/03* | (2006.01) |
| *G08B 13/191* | (2006.01) |
| *G08B 29/18* | (2006.01) |

(56) References Cited

U.S. PATENT DOCUMENTS

| | | | |
|---|---|---|---|
| 4,704,533 A | 11/1987 | Rose et al. | |
| 4,800,278 A | 1/1989 | Taniguti et al. | |
| 4,963,749 A | 10/1990 | McMaster | |
| 4,988,116 A | 1/1991 | Evertsen | |
| 5,045,702 A | 9/1991 | Mulleer | |
| 5,105,084 A | 4/1992 | Nagai et al. | |
| 5,283,551 A | 2/1994 | Guscott | |
| 5,313,060 A | 5/1994 | Gast et al. | |
| 5,461,231 A | 10/1995 | Sugimoto et al. | |
| 5,789,751 A | 8/1998 | Ma | |
| 5,923,250 A | 7/1999 | Pildner et al. | |
| 5,936,666 A | 8/1999 | Davis | |
| 6,049,080 A | 4/2000 | Ito | |
| 6,163,025 A | 12/2000 | Pantus | |
| 6,340,816 B1 | 1/2002 | Micko | |
| 6,350,076 B1 | 2/2002 | Wagner et al. | |
| 6,559,448 B1 | 5/2003 | Mueller et al. | |
| 6,879,240 B2 | 4/2005 | Kruse | |
| 7,042,134 B2 | 5/2006 | Micko | |
| 7,075,431 B2 | 7/2006 | Buckley et al. | |
| 7,141,910 B2 | 11/2006 | Micko | |
| 7,183,912 B2 | 2/2007 | Micko | |
| 7,352,107 B2 | 4/2008 | Micko | |
| 7,362,224 B2 | 4/2008 | Zambon | |
| 7,399,969 B2 | 7/2008 | Micko | |
| 7,399,970 B2 | 7/2008 | Micko | |
| 7,498,576 B2 | 3/2009 | Micko | |
| 7,579,595 B2 | 8/2009 | Micko | |
| 7,622,845 B2 | 11/2009 | Micko | |
| 7,628,551 B2 | 12/2009 | Leyden et al. | |
| 7,686,287 B2 | 3/2010 | Dixon et al. | |
| 7,710,337 B2 | 5/2010 | Blalock | |
| 7,755,052 B2 | 7/2010 | Micko | |
| 7,909,521 B2 | 3/2011 | Son | |
| 8,314,390 B2 | 11/2012 | Micko | |
| 8,354,643 B2 | 1/2013 | Micko | |
| 8,378,820 B2 | 2/2013 | Micko | |
| 8,414,201 B2 | 4/2013 | Skeoch et al. | |
| D742,770 S | 11/2015 | Windstrup et al. | |
| 9,188,487 B2 | 11/2015 | Zhevelev et al. | |
| 9,255,786 B2 * | 2/2016 | Micko | G01J 5/0025 |
| 9,301,412 B2 | 3/2016 | Micko et al. | |
| 9,304,044 B2 | 4/2016 | Micko | |
| 9,377,156 B2 | 6/2016 | Wong | |
| 9,569,953 B2 | 2/2017 | Micko | |
| 10,055,973 B2 | 8/2018 | Micko | |
| 10,445,998 B2 * | 10/2019 | Micko | G08B 13/191 |
| 2004/0118985 A1 | 6/2004 | Omps | |
| 2004/0164647 A1 | 8/2004 | Micko | |
| 2004/0169145 A1 | 9/2004 | Micko | |
| 2005/0040947 A1 | 2/2005 | Buckley et al. | |
| 2005/0061979 A1 | 3/2005 | Narasako et al. | |
| 2005/0184869 A1 | 8/2005 | Micko | |
| 2005/0219046 A1 | 10/2005 | Noguchi | |
| 2005/0247845 A1 | 11/2005 | Li et al. | |
| 2006/0138329 A1 | 6/2006 | Wu et al. | |
| 2006/0152109 A1 | 7/2006 | Micko | |
| 2006/0254999 A1 | 11/2006 | Senften | |
| 2007/0030148 A1 | 2/2007 | Gabriel et al. | |
| 2007/0099469 A1 | 5/2007 | Sorensen | |
| 2007/0114346 A1 | 5/2007 | Omps | |
| 2008/0170121 A1 | 7/2008 | Su et al. | |
| 2009/0065671 A1 | 3/2009 | Burgstaller | |
| 2009/0196597 A1 | 8/2009 | Messinger et al. | |
| 2009/0302220 A1 | 12/2009 | Micko | |
| 2010/0220192 A1 | 9/2010 | Cirker | |
| 2011/0210253 A1 | 9/2011 | Micko | |
| 2012/0038778 A1 | 2/2012 | Klager et al. | |
| 2012/0105229 A1 | 5/2012 | Kates | |
| 2013/0119253 A1 | 5/2013 | Zhevelev et al. | |
| 2013/0169805 A1 | 7/2013 | Park | |
| 2014/0319349 A1 | 10/2014 | Horie et al. | |
| 2014/0350436 A1 | 11/2014 | Nathan et al. | |
| 2015/0208826 A1 | 7/2015 | Yang et al. | |
| 2015/0233702 A1 | 8/2015 | Micko | |
| 2015/0233765 A1 | 8/2015 | Micko | |
| 2016/0010972 A1 | 1/2016 | Micko | |

FOREIGN PATENT DOCUMENTS

| | | | |
|---|---|---|---|
| CN | 202284971 U | 6/2012 | |
| CN | 102472030 B | 5/2014 | |
| EP | 2533026 A | 12/2012 | |
| JP | S58213396 A | 12/1983 | |
| JP | S6214028 B2 | 3/1987 | |
| JP | H09297057 A | 11/1997 | |
| JP | 2006018750 A | 1/2006 | |
| JP | 2009014483 A | 1/2009 | |
| JP | 2013210306 A | 10/2013 | |
| KR | 1020100065897 A | 6/2010 | |
| KR | 20100009894 U | 10/2010 | |
| KR | 1020100109125 A | 10/2010 | |
| KR | 1020100116828 A | 11/2010 | |
| WO | WO-2011059830 A2 * | 5/2011 | ............ G01J 5/0846 |
| WO | 2015088470 A1 | 6/2015 | |
| WO | 2015132272 A1 | 9/2015 | |
| WO | 2015187326 A1 | 12/2015 | |
| WO | 2017147462 A1 | 8/2017 | |

OTHER PUBLICATIONS

USPTO, Notice of Allowance for U.S. Appl. No. 15/884,454, dated Jul. 18, 2019.
USPTO, Notice of Allowance for U.S. Appl. No. 16/103,757, dated Jun. 20, 2019.
Excelitas Technologies, Infrared Sensing Solutions, Oct. 29, 2012.
AFDIP, Response-Amendment to Office Action in Counterpart Chinese Application 20130081471.3, dated Oct. 30, 2017.
Canadian Intellectual Property Office, Office Action for counterpart Canadian Patent Application 2930127, dated May 31, 2017.
Chinese Intellectual Property Office, Office Action in Counterpart Application 20130081471.3, dated Mar. 7, 2018.
Chinese Intellectual Property Office, Office Action in Counterpart Application 20130081471.3, dated Jun. 28, 2017.
Chowdhury, et al., Video Synthesis of Arbitrary Views for Approximately Planar Scenes, Proceedings of International Conference on Acoustics, Speech and Signal Processing (ICASSP'03), pp. III_497-III_500, Apr. 6, 2003.
European Patent Office, Provisional Opinion for counterpart EPO Application 13899275.5, dated Jun. 8, 2017.
European Patent Office, Supplemental Search Opinion for counterpart EPO Application 13899275.5, dated Oct. 6, 2017.
Excelitas Technologies, DigiPyro(r) PYQ 2898 Application Note, 2011, retrieved from http://www.excelitas.com/downloads/app_digipyropyq2898_0208.pdf on Aug. 14, 2013.
Intellectual Property Office of Singapore, Written Opinion regarding foreign counterpart application SG 12201604463U, Apr. 25, 2017.
Intellectual Property Office of Singapore, Examination Report for Counterpart Singaporean patent application 11201604463U, dated Nov. 9, 2017.
Japan Patent Office, Final Notice of Reasons for Refusal for counterpart Japanese application 2016-557872, dated May 22, 2018.
Japan Patent Office, Notice of Reasons for Refusal for counterpart Japanese application 2016-557872, dated Sep. 5, 2017.

(56) References Cited

OTHER PUBLICATIONS

Kang, Ea Roo, Response to Office Action in related Korean Application 10-2016-7018545, dated Jun. 27, 2018.
Keane, Paul, Office Action Response for counterpart EPO application 13899275.5, dated Mar. 16, 2018.
Korean Intellectual Property Office, International Search Report for International Patent Application #PCT/US13/73799, dated Sep. 23, 2014.
Korean Intellectual Property Office, International Search Report for PCT/US2015/030692, dated Aug. 26, 2015.
Korean Intellectual Property Office, International Search Report for PCT/US2017/016106, dated Apr. 20, 2017.
Korean Intellectual Property Office, Notice of Allowance for related Korean Applicatoin 10-2016-7018545, dated Jul. 17, 2018.
Korean Intellectual Property Office, Notification of Reason for Refusal for related Korean Patent Application 10-2016-7018545, dated Mar. 29, 2018.
Korean Intellectual Property Office, Written Opinion of the International Search Authority for PCT/US2017/016106, dated Apr. 20, 2017.
Korean Intellectual Property Office, Written Opinion of the International Searching Authority for International Patent Application #PCT/US13/73799, dated Sep. 23, 2014.
Korean Intellectual Property Office, Written Opinion of the International Searching Authority for PCT/US2015/030692, dated Mar. 26, 2015.
Korean IP Office, International Search Report for PCT/US2017/019414, dated Apr. 28, 2017.
Korean IP Office,Written Opinion of the International Searching Authority for PCT/US2017/019414, dated Apr. 28, 2017.
Kwon, Seonggeun, Written Opinion (Response) to Korean Intellectual Property Office in related application #KR-10-2016-7018545, dated Jun. 27, 2018.
Micko, Scott, Unpublished U.S. Appl. No. 14/699,184, filed Apr. 29, 2015.
Micko, Scott, Unpublished U.S. Appl. No. 14/699,277, filed Apr. 29, 2015.
Murai Shinjyu Gip, Amendment-Response to Notice of Reasons for Refusal for counterpart Japanese application 2016-557872, dated Dec. 27, 2017.
Murai Shinjyu Gip, Amendment-Response to Notice of Reasons for Refusal for counterpart Japanese application 2016-557872, dated Jul. 5, 2018.
Netgear, VueZone Wireless Video Cameras: How it Works—Internet Web Page dated Oct. 6, 2012, retrieved from "https://web.archive.org/web/20111121082129/http://www.vuezone.com/learn-more/how-it-works" on Jun. 23, 2015.
Paton, Miram, Amendment/Remarks After Examiner's Report in counterpart Canadian Patent Application 2930127, dated Feb. 12, 2018.
Perkinelmer Optoelectronics, DigiPyro(r) Family PYD 1998, PYD 1988, PYD 1978 Application Note, 2008, retrieved from http://www.datasheetarchive.com/dl/Datasheets-UD4/DSAUD0062254.pdf on Sep. 10, 2013.
Quek, Regina, Response to Written Opinion of Intellectual Property Office of Singapore for related Singapore Patent Applicatino #11201604463U, dated Sep. 25, 2017.
Wu, et al., The Pyroelectric Sensor Based System; Human Tracking and Self-Calibration Scheme, Information Science and Technology (ICIST), 2012 International Conference on, IEEE, pp. 839-846, Mar. 23, 2012.

\* cited by examiner

MOTION SENSOR USING LINEAR ARRAY OF INFRARED DETECTORS

CROSS-REFERENCE TO RELATED APPLICATIONS

The present application is a continuation of International Patent Application PCT/US2017/016106 entitled MOTION SENSOR USING LINEAR ARRAY OF INFRARED DETECTORS filed on Feb. 2, 2017, which was published on Aug. 10, 2017 as WO2017/136485 and claims priority to U.S. Provisional Patent Application No. 62/290,923, entitled Improved Self-Scanning Passive Infrared Sensor, filed on Feb. 3, 2016. This patent application is also related to International Patent Application PCT/US2013/073799 published on Jun. 18, 2015 as WO2015/088470A1, entitled MOTION DETECTION and International Patent Application PCT/US2015/030692 published on Dec. 10, 2015 as WO2015/187326A1, entitled MOUNT FOR SECURITY DEVICE. The entire contents of all four of the above-mentioned patent applications are hereby incorporated by reference for any and all purposes.

BACKGROUND

Technical Field

The present subject matter relates to motion detection. More specifically it relates to multi-output infrared radiation detectors and motion sensors using such an infrared detector.

Background Art

Motion Sensors utilizing infrared (IR) radiation detectors, or simply IR detectors, are well known. They may also be referred to as PIR (passive infrared) detectors because they do not emit IR radiation, but simply passively detect IR radiation emitted by objects due to their warmth. Such sensors are often used in security systems or lighting systems to detect movement in a monitored space. An infrared detector detects changes in mid-infrared (IR) radiation having a wavelength of about 6-14 microns. These changes are due to temperature differences between a warm object, such as a warm blooded animal, and its background environment as the warm object moves through that environment. Upon detection of motion, motion sensors typically activate an audible alarm such as a siren, turn on a light, and/or transmit an indication that motion has been detected.

A typical PIR detector utilizes a pyroelectric or piezoelectric substrate with a detector element that consists of conductive areas on opposite sides of the substrate acting as a capacitor. As the substrate changes temperature, charge is added or subtracted to the capacitor, changing the voltage across the capacitor. The amount of mid-IR radiation that hits the detector element determines the temperature of that area of the substrate, and therefore, the voltage across the capacitor that makes up the detector element. Some motion sensors utilize an infrared detector that includes multiple detector elements. To reduce the chance of false alarms, some infrared detectors include a pair of equally sized detector elements of opposing polarities. Non-focused out-of-band radiation, as well as ambient temperature changes or physical shock, is equally incident on both detector elements, thus causing the signals from the equal and opposite elements to roughly cancel one another.

Many motion sensors incorporate an optical array (made of optical elements such as lenses, focusing mirrors, and so on) to be able to monitor a large space with a single infrared detector. The optical array directs the IR radiation from multiple monitored volumes onto the infrared detector and sometimes includes filters to minimize the radiation outside of the desired mid-infrared range from reaching the infrared detector. Each of the monitored volumes is typically a pyramidal shaped volume extending into the space to be monitored with the apex of the pyramid at the motion sensor. Concentrations of radiation from each of the pyramids are projected by the optical arrays onto the infrared detector where they are superimposed, and different regions of the infrared detector are heated based on the amount of IR radiation received from the superimposed projections. The detector elements on the infrared detector react to the localized heating by changing their voltage. The resultant change in voltage across the detector elements is monitored and used to detect motion in the space being monitored.

While a motion sensor can be used for either occupancy detection or for detection of an intruder, the two uses have very different requirements. For intrusion detection, effective detection of a human moving through a volume of interest is important, but false detections can lead to negative consequences ranging from annoying alarm sirens that need to be turned off, to financial consequences from summoning the police too many times. Therefore a motion sensor for intrusion detection needs to have good sensitivity while having a very high rejection of possible false alarm sources such as pets moving through a room. An occupancy sensor, however, has a very different use model. The consequences for turning a light on for falsely determining a room is occupied are very minor, perhaps a few pennies for electricity that wasn't really needed. But if a person is in a room and the lights repeatedly go off because the occupancy detector does not register the movement, the occupant is likely to become frustrated. This means that a motion sensor for occupancy detection needs to be very sensitive to small movements, but a relatively high rate of false alarms can be tolerated.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

Figure 1:
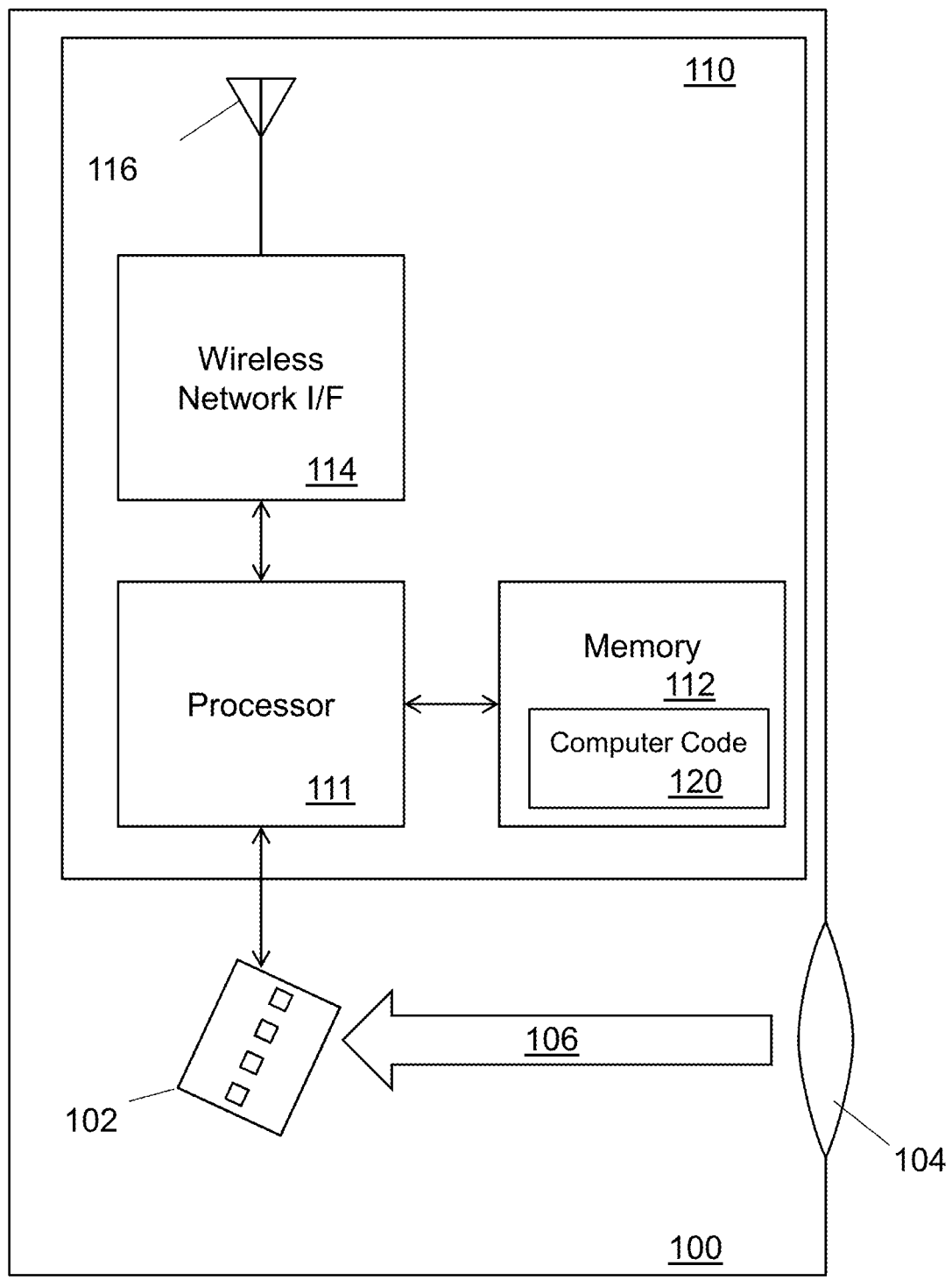
FIG. 1 shows a block diagram of an embodiment of a motion sensor.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

A pyroelectric material is a material that temporarily generates a voltage as it is heated or cooled. If the temperature remains constant, the voltage may gradually disappear due to leakage current, depending on the pyroelectric material used. Examples of pyroelectric materials include the mineral tourmaline and the compounds gallium nitride, cesium nitrate, cobalt phthalocyanine, and lithium tantalite. A piezoelectric material is a material that generates a voltage in response to mechanical stress. Examples of piezoelectric materials include tourmaline, quartz, topaz, cane sugar, and sodium potassium tartrate tetrahydrate. Some materials exhibit both pyroelectric and piezoelectric properties and localized heating of a piezoelectric material can cause mechanical stress which then generates a voltage. Therefore, while the detailed physical properties of pyroelectric materials and piezoelectric materials are different, the two terms are used as synonyms herein and in the claims. Thus, a reference to a pyroelectric material includes both pyroelectric materials and piezoelectric materials.

An infrared radiation detector, or simply infrared detector or IR detector, is a component having one or more outputs to provide information related to warm objects in a field of view of the infrared detector. An infrared detector has one or more detector elements on a substrate. The detector elements receive electromagnetic radiation, such as mid-infrared radiation, and change an electrical characteristic, such as voltage, of their associated outputs. Many different types of IR detectors can be created, including, but not limited to, a pyroelectric detector, a piezoelectric detector, a bolometer, a thermocouple, a thermopile, a semiconductor charge-coupled device (CCD), or a complementary metal-oxide-semiconductor (CMOS) sensor.

An IR detector based on a pyroelectric substrate fundamentally responds to changes in IR radiation incident on its detector elements, generating minute current flows in response to changes in temperature of their detector elements, and signals generated from such detectors contain virtually no zero-frequency component. Thus, pyroelectric do not provide a signal representative of a level of infrared radiation incident on the detector elements. This makes detection of non-moving objects very difficult to impossible. Other types of IR detectors, however, such as bolometers, thermocouples, thermopiles, CCDs, and CMOS sensors, can respond to a steady-state level of IR radiation. These level-sensitive detectors allow for detection of non-moving radiation sources because they generate a signal that is representative of a level of infrared radiation incident on a linear array of detector elements.

Thermocouples and thermopiles, which are made from several thermocouples connected in series, generate a voltage proportional to a temperature gradient. A bolometer, which can also refer to a microbolometer as used herein, has detectors that vary their electrical resistance based on temperature. Microbolometers generally include an array of detectors, that can be organized in a one-dimensional linear array or a two-dimensional array. A two-dimensional microbolometer can be used as a detector for a thermal camera to create a thermal image. CCD and CMOS based sensors convert photons into charge which can then be sensed to determine an amount of radiation that is incident on its sensor elements. Each type of IR detector has different characteristics, but any type of IR detector can be used, depending on the embodiment.

A motion sensor is a system for detecting motion in a monitored space, which can also be referred to as a detection space. A motion sensor includes one or more infrared detectors, an optical system to direct electromagnetic radiation from the monitored volumes onto the infrared detector(s), and circuitry to receive the signals the infrared detector(s) which are dependent on infrared radiation incident on the detector(s) and take action based on that information. Any type of action can be taken, but various embodiments take actions such as, but not limited to, sounding an audible alarm, turning a light on or off, or sending a message indicating that motion was detected.

A monitored volume is a volume in space that is directed to a detector element by an optical system. In most cases, the monitored volume retains a shape of the detector element as it is projected into space and grows larger as the distance from the detector increases. "Curtain" is used herein to refer to a stacked set of monitored volumes. The stacked set of monitored volumes may be vertical or may have a tilt from vertical. A row of monitored volumes is a set of monitored volumes that includes a single monitored volume from each of multiple curtains at the same relative position within each curtain. The curtains of monitored volumes cover at least a portion of a detection space where movement or occupancy of a human may be detected.

Embodiments of a motion detector are disclosed herein using an IR detector having a linear array of detector elements. The IR detector may have any number of detector elements, but some embodiments include at least four detector elements, with specific embodiments including 4, 8, 9, 10, 16, and 32 detector elements, each organized in a linear array. The detector elements may be of any size and be spaced at any distance, but in most embodiments the individual detector elements of the array are substantially the same size. In some embodiments, the detector elements are positioned in the linear array at a pitch that is about twice the length of a single detector element to provide a space between detectors that is approximately equivalent to the size of a detector. In another embodiment, the detectors are spaced very close together with very little space between detectors. IR radiation from two or more curtains of monitored volumes is projected onto the detector elements. In at least one embodiment, a curtain of monitored volumes has the same number of monitored volumes as the IR detector has detector elements, so there is a one-to-one correspondence between the monitored volumes of a single curtain and the detector elements of the IR detector.

IR radiation from the monitored volumes is projected onto the detectors by an optical system. The optical system can include any number of lenses, reflecting elements, prisms, filters, polarizers, and/or any other type of optical element. In some embodiments, a Fresnel lens may be used in the optical system. Some embodiments may use one lens for each curtain of monitored volumes and some embodiments may use a separate lens for each monitored volume.

One motion-sensor application is to detect and report human occupancy within a monitored space. Existing vertical-array "single-curtain" applications can only monitor a small angle within a space that is potentially occupied by humans. Additionally, though the signals can allow the motion sensor's processing system to infer information about a passing target, the system can be fooled by signal sets that can be caused by changing-temperature stationary objects within the fields of view.

Embodiments of improved vertical-array sensors are disclosed herein to provide effective occupancy-detection. Three different aspects are disclosed that can be used individually or in any combination, depending on the embodiment:

1. Multiple curtains for monitoring a detection space over a larger angle;
2. Use of detectors' zero-frequency signals (for continued-occupancy detection without motion);
3. Curtains disposed at a tilt angle from vertical for providing motion confirmation and motion-direction information.

Multiple curtains can be realized by use of the optical system to simultaneously project infrared radiation from the multiple curtains onto the linear array of detector elements. The number and size of the curtains can vary, depending on the embodiment, but common choices for the azimuth angle to cover with the curtains include 90° and 180°, although any azimuth angle coverage can be used, including azimuth angles less than 90° or greater than 180°. One example embodiment includes four curtains covering about 90° with each individual curtain having a field-of-view width (sometimes simply referred to as "width") of between 5° and 20°, leaving spaces between the curtains of 18° to 3°. Another example embodiment includes eighteen curtains covering about 180° with each individual curtain having a field-of-view of between 2° and 8°, leaving spaces between the curtains of 8° and 2°. Many embodiments fill a substantial percentage of the monitored space with the field-of-view widths of the curtains.

Continued occupancy detection without motion can be realized by using the zero-frequency signal component of an appropriate detector (e.g. bolometer or thermopile). When a warm object enters any one of the curtains of monitored volumes, and settles in place, one or several detector elements generate signals. Based on criteria in the motion sensor's detection algorithm (e.g. signal number, size and timing), detection of multiple signals can be determined first to be an actual motion, and further, possibly to be that of an animal or a person. Next, as long as that event's zero-frequency signal components remain, object occupancy may be determined as continuing. Of course, a motion sensor built as described herein cannot determine which curtain is occupied and cannot generate an accurate thermal image of the room, which can be an advantage from a privacy point-of-view. Nevertheless, the zero-frequency signals from level-sensitive detectors enable better continued-occupancy determination than in a conventional pyroelectric-detector-based infrared sensor, in which the detector lacks a zero-frequency signal component.

In order to avoid "detection" of stationary objects, the motion sensor's human-occupancy-detection algorithm may require occasionally changing signals (indicating further post-entry motion). However, because of the zero-frequency signal components, the time span between such required signal changes can be much longer than in a conventional pyroelectric-detector-based infrared sensor, thus enabling the motion sensor, following a first detection of a person entering a curtain, better to support continued occupancy detection and reporting in cases where further motion is much less frequent, and in many cases, almost nil (such as might be the case for a person reclining in a lounge chair).

In some embodiments, the curtains are tilted from a vertical position by a tilt angle. This can be accomplished through either the orientation of the IR detector within the housing of the motion sensor, the design of the optical system, or a combination thereof. With the curtains tilted from a vertical position, a human moving through the detection space who is tall enough to intersect with multiple monitored volumes of a single curtain, enters the different monitored volumes of a single curtain at differing times. This allows motion to be more accurately detected, and also allows a direction of motion to be detected.

The tilt angle, the spacing of the curtains, and the size and spacing of the monitored volumes within a curtain are chosen so that one or more sets of four signals from the IR detector can be processed to produce quadrature signals from a moving object. A quadrature horizontal spatial relationship between rows of the curtains of monitored volumes produces a phase relationship between signals from the IR detector that can be processed to produce quadrature signals. Non-moving objects will not produce quadrature signals, so tilting the curtains can be effective in suppressing false reports of occupancy.

In a first example embodiment, a motion sensor uses an IR detector with a linear array of four circular detector elements, and its optical system generates nine curtains of four monitored volumes each, spaced at 20° degree intervals both between curtains and between monitored volumes of a single curtain. The 36 monitored volumes each have a size of about 10 degrees of arc and are conical in shape, due to the shape of the detector elements and the characteristics of the optical system. In order to have a quadrature horizontal spatial relationship, a tilt angle for the curtains is calculated that positions a horizontal distance between a center of the first monitored volume of a curtain and a center of the second monitored volume of the same curtain at one quarter of the horizontal distance between the centers of the first monitored volumes of two adjacent curtains. The horizontal distance can be measured on a virtual cylindrical surface centered on the motion sensor, on a virtual plane perpendicular to one of the monitored volumes used in the measurement. Alternatively, angles of arc can be used in lieu of linear distance to calculate the distances. In this first example embodiment, the horizontal distance between the centers of the first monitored volumes of adjacent curtains is the curtain spacing of 20°, so one quarter of that is 5°. The tilt angle required to provide a horizontal distance between the centers of the first two monitored volumes of a single curtain can be calculated using trigonometry for a right triangle as $\sin(\Theta)=\text{Opposite/Hypotenuse}$ where the hypotenuse is the linear distance between the centers of the first two monitored volumes of a single curtain, or 20°, and the opposite side of the tilt angle is one quarter of the horizontal distance between the centers of the first monitored volumes of adjacent curtains, or 5°. This yields a value for the tilt angle, $\Theta$, of 14.5° for the first example embodiment.

In a second example embodiment, a motion sensor uses an IR detector with a linear array of 32 detector elements, and its optical system generates five curtains of 32 monitored volumes each, with curtains spaced at 40° degree intervals and monitored volumes of a single curtain spaced at 3.5° intervals. The 192 monitored volumes each have a size of about 3 degrees of arc by 10 degrees of arc and are pyramidal in shape, due to the shape of the detector elements and the characteristics of the optical system. In this example, a quadrature horizontal spatial relationship between every fourth monitored volume is configured by calculating a tilt angle for the curtains that positions the curtains to have a horizontal distance between a center of the first monitored volume of a curtain and a center of the fifth monitored volume of the same curtain that is one quarter of the horizontal distance between the centers of the first monitored volumes of two adjacent curtains. In this second example embodiment, the horizontal distance between the centers of the first monitored volumes of adjacent curtains is the curtain spacing of 40°, so one quarter of that is 10°. The tilt angle required to provide a quadrature horizontal spatial relationship between every fourth monitored volume can be calculated as $\sin(\Theta)=10/14$ where the hypotenuse is the linear distance (as represented by degrees of arc) between the centers of the first and fifth monitored volumes of a single curtain, which is 14° in this embodiment. This yields a value for the tilt angle, $\Theta$, of about 45° for the second example embodiment. Note that signals from pairs of detector elements can be combined to effectively create curtains with 16 monitored volumes that have a size of about 6.5 degrees of arc (i.e. two discrete monitored volumes plus the space between them) by 10 degrees of arc to increase the size of the monitored volumes while maintaining the quadrature horizontal spatial relationship.

Signals from the detector elements are received and processed by electronic circuitry to determine if there is a human moving through and/or occupying the detection space. The electronic circuitry can include one or more processing elements, such as a microprocessor, although some embodiments may use dedicated analog and/or digital circuitry to process the signals, such as an application specific integrated circuit (ASIC) that does not execute computer instructions to process the signals from the detector elements and detect the human. If a processor is included in the motion sensor, computer readable program code is stored in the motion sensor for use by the processor. Circuitry such as an analog-to-digital converter (ADC) may be included to convert analog characteristics of the signals generated by the detector elements into digital values that can be used by the processor. The ADC may be included in a package with the IR detector, included with the microprocessor, or included in other circuitry.

The electronic circuitry can process the signals to look for changes in the electrical characteristics in more than one signal to signify that a large warm body, such as a human, is moving through the detection space. Once a human has been detected moving into the detection space, a continued indication of their presence may be signaled by continuing an output indicating warmth if the detector elements use a level-sensitive IR detection technology.

In at least some embodiments where the curtains are tilted from vertical, the electronic circuitry may be able to detect a direction of motion by the human through the detection space by determining a relative phase relationship between signals. If the curtains are tilted with higher monitored volumes to the right of lower monitored volumes and signals from lower monitored volumes have a leading phase relationship with signals from higher monitored volumes, the human can be determined to be moving to the right. Conversely, if the signals from lower monitored volumes have a trailing phase relationship with signals from higher monitored volumes, the human can be determined to be moving to the left. Direction of motion can be quite useful in certain applications where lights may be selectively turned on or doors selectively opened depending on a human's walking direction.

In embodiments where the curtains are at a tilt angle to create a quadrature horizontal spatial relationship for the monitored volumes, the electronic circuitry may determine human movement by detecting a quadrature phase relationship between the signals received from the IR detector. In one embodiment, the four signals, referred to as A, B, C, and D, associated with monitored volumes having the quadrature horizontal spatial relationship are selected. A first composite signal is created by subtracting C from A, and a second composite signal is created by subtracting D from B. The first and second composite signals are then processed to detect a quadrature phase relationship (i.e. a phase relationship of about 90°) between the first composite signal and the second composite signal, which can represent an object of appropriate size and of relatively uniform width (for example, a human torso) over the height range monitored by the four associated monitored volumes. In some embodiments, additional calculations are made using other sets of four signals that are also associated with monitored volumes having the quadrature horizontal spatial relationships to detect quadrature phase relationships. This can be done in addition to, or instead of, detecting the quadrature phase relationship between the first composite signal, A-C, and the second composite signal, B-D. For example in one embodiment, additional passes may be made looking for a quadrature phase relationship between B-D and C-E, and then between C-E and D-F. Once a human has been detected, the motion of the human may be determined based on the sign of the phase between the two composite signals. While it is not necessary to apply this type of processing to all of the possible array-element sets, human motion can be discerned by appropriate choice for processing of one or more sets that are most likely to intersect moving humans' torsos.

Reference now is made in detail to the examples illustrated in the accompanying drawings and discussed below.

FIG. 1 shows a block diagram of an embodiment of a motion sensor 100, which can also be referred to as an infrared sensor 100. The infrared sensor 100 includes an infrared detector 102 having a single linear array of detector elements disposed on a substrate. An electrical characteristic of an individual detector element of the linear array of detector elements is reactive to a level of infrared radiation incident on the individual detector element. The infrared sensor 100 also includes an optical system 104 to simultaneously direct electromagnetic energy 106 from two or more curtains of monitored volumes onto the linear array of detector elements of the infrared detector 102. In embodiments, the electromagnetic energy directed onto the detector elements includes infrared light, and the infrared sensor 100 may include a filter that attenuates at least some of the electromagnetic energy incident to the individual detector element having a wavelength outside of a range of 6 to 14 microns.

Any number of curtains of monitored volumes may be directed to the IR detector 102 by the optical system 104, but in most embodiments two or more curtains are used. In some embodiments, the two or more curtains of the monitored volumes have a tilt angle from a vertical orientation of the infrared sensor 100 of between 5 and 80 degrees. This can be accomplished in different ways, but in the infrared sensor 100 of FIG. 1, the infrared detector 102 is mounted within the infrared sensor 100 with the linear array at the tilt angle from the vertical orientation of the infrared sensor 100.

The infrared sensor 100 of the embodiment of FIG. 1 also includes circuitry 110 such as a processor 111 coupled to the infrared detector 102. Memory 112 which can store computer code 120 is coupled to the processor 111 in embodiments, and the processor 111 can read the computer code 120 from the memory 112 and execute the computer code 120 to perform one or more of the methods described herein in some embodiments. A wireless network interface 114 is coupled to an antenna 116 as well as to the processor 111 to allow radio frequency messages to be sent and/or received by the motion sensor 100 over a wireless computer network such as, but not limited to, a Wi-Fi network or a Zigbee network. Other embodiments include different types of circuitry 110 that may or may not include a processor 111, but may include hard-wired or specialized circuitry to perform one or more methods described herein. Some embodiments may include a wired network interface, such as for an Ethernet network, instead of or in addition to the wireless network interface 114.

In embodiments, the electronic circuitry 110 receives signals from the detector elements of the infrared detector 102. The electronic circuitry 110 processes the signals and generates an indication that a human is moving through a detection space that includes the two or more curtains of monitored volumes and in some embodiments can generate an indication of a direction of movement of a human moving through the detection space. In some embodiments, the electronic circuitry 110 can generate an indication that a human is occupying a detection space that includes the two or more curtains of monitored volumes. The electronic circuitry of some embodiments is able to generate a first indication in response to a human moving through a detection space that includes the two or more curtains of monitored volumes and a second indication in response to the lack of the human occupying the detection space, wherein no indication is generated in response to a small animal moving through or occupying the detection space. The motion indication can include a radio frequency message sent through the antenna 116, a visual indication, and/or an audible indication, depending on the embodiment.

The memory 112 includes at least one non-transitory computer readable storage medium which can have computer readable program code 120 embodied therewith. The computer readable program code 120 includes computer readable program code to receive a set of electrical signals at electronic circuitry 110, where electrical properties of the electrical signals are respectively based on infrared radiation 106 incident on a linear array of detector elements of the infrared detector 102. The infrared radiation 106 is simultaneously directed from two or more curtains of monitored volumes onto the linear array of the detector elements by an optical system 104. The two or more curtains of the monitored volumes have a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element. The linear array of the detector elements comprise the first detector element, the second detector element, the third detector element, and the fourth detector element. The two or more curtains of the monitored volumes comprise the first row of monitored volumes, the second row of monitored volumes, the third row of monitored volumes and the fourth row of monitored volumes. Additionally, the set of electrical signals comprise a first signal coupled to the first detector element, a second signal coupled to the second detector element, a third signal coupled to the third detector element, and a fourth signal coupled to the fourth detector element. The computer readable code 120 also includes computer readable program code to detect a quadrature phase relationship between the first signal, the second signal, the third signal, and the fourth signal by processing the set of electrical signals using electronic circuitry and computer readable program code to provide an indication that a human was detected in a detection space that includes the two or more curtains of monitored volumes in response to detecting the quadrature phase relationship.

In some embodiments, the computer readable program code 120 also includes computer readable program code to determine a direction of movement by the human in the detection space and computer readable program code to include, in the indication, the direction of movement by the human. In some embodiments, the computer readable program code also includes computer readable program code to create a first composite signal by subtracting the third signal from the first signal and creating a second composite signal by subtracting the fourth signal from the second signal, computer readable program code to determine a composite phase relationship between the first composite signal and the second composite signal, and computer readable program code to detect the quadrature phase relationship if a magnitude of the composite phase relationship is between 70 and 110 degrees. The computer readable program code 120 may also include computer readable program code to determine a direction of movement by the human in the detection space based on a sign of the composite phase relationship and computer readable program code to include, in the indication, the direction of the movement by the human. In some embodiments the computer readable program code also includes computer readable program code to detect a second quadrature phase relationship between four signals of the set of electrical signals. The four signals include an additional signal associated with an additional detector element of the linear array of detector elements, but the additional signal is not the first electrical signal, the second electrical signal, the third electrical signal, or the fourth electrical, and computer readable program code to provide the indication based on detecting the first quadrature phase relationship and/or the second quadrature phase relationship.

Figures 2A, 2B:
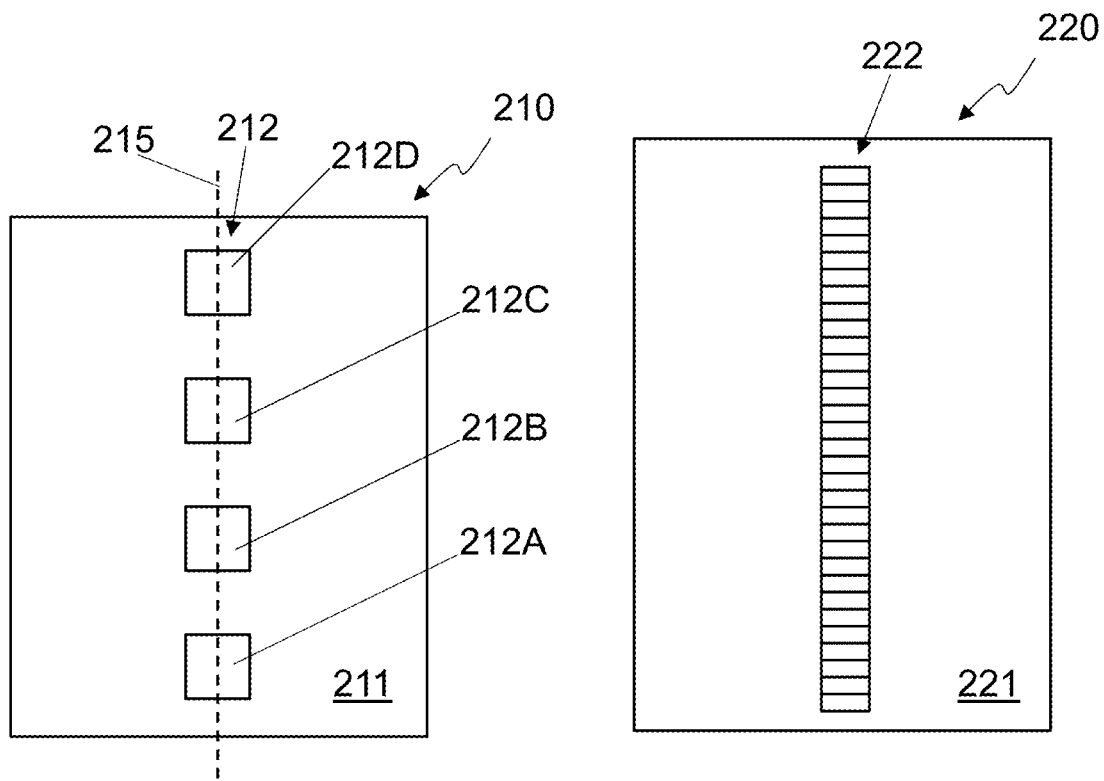
FIGS. 2A and 2B show embodiments of linear arrays of detector elements.

FIG. 2A shows first embodiment of a linear array of detector elements 212 on a substrate 211 to form a first infrared detector 210. The first embodiment of the infrared detector 210 includes a first detector element 212A, a second detector element 212B, a third detector element 212C, and a fourth detector element 212D. Any number of detector elements can be included, but in most embodiments, the linear array comprises 4 or more detector elements. The detector elements 212 are arranged in a linear array by spacing them along a single axis 215 as shown. The size and spacing of the detector elements 212 can be determined based on the needs of a particular embodiment, but in the embodiment shown, the detector elements 212 are substantially square and are spaced apart from each other in the linear array with spaces that are about the same size as the individual detector elements. The individual detector elements of the single linear array of the detector elements 212 can use any technology, including, but not limited to, a pyroelectric detector, a piezoelectric detector, a bolometer, a thermocouple, a thermopile, a semiconductor charge-coupled device (CCD), or a complementary metal-oxide-semiconductor (CMOS) sensor.

Each of the detector elements 212 changes an electrical characteristic a signal provided on a line coupled to the detector element based on infrared radiation incident on the detector element. Electronic circuitry, which may be circuitry included on the substrate 211, separate circuitry packaged in a common package with the infrared detector 210, or circuitry external to the infrared detector package, can detect the change in the electrical characteristic and provide a signal to additional electronic circuitry for processing.

FIG. 2B shows a second embodiment of a linear array of detector elements 222 on a substrate 221 to form a second infrared detector 220. The linear array of detector elements 222 includes 32 individual detector elements on the substrate 221. In the embodiment shown, the individual detector elements are closely spaced together, with only enough space between the individual detector elements to isolate them from each other. If used in a motion detector, signals from non-adjacent individual detector elements may be used in some embodiments to detect motion instead of using adjacent detector elements, such as using alternating detector elements, or every fourth detector element. In some embodiments, multiple detector elements may be ganged together by the electronic circuitry to combine the outputs of adjacent detector elements, such as combining the detector elements into pairs yielding a 16 element linear array of virtual detector elements.

In various embodiments, the lines coupled to the individual detector elements of the array of detector elements 222 may be individually routed to external electronic circuitry, or they may be combined and/or multiplexed by electronic circuitry included on the substrate 221 or packaged with the infrared detector 220 to reduce the number of I/O lines required. In at least one embodiment, the array may be addressable, allowing external electronic circuitry to provide an address of a particular individual detector element so that internal electronic circuitry can provide a signal based on the characteristic of that individual detector element which has been affected by infrared radiation. The details of the circuitry used to provide the signals from the array of detector elements 222 depends on the embodiment of the infrared detector 220, including the number of detector elements and the technology of the detector elements, as well as details of the packaging requirements.

Figure 2C:
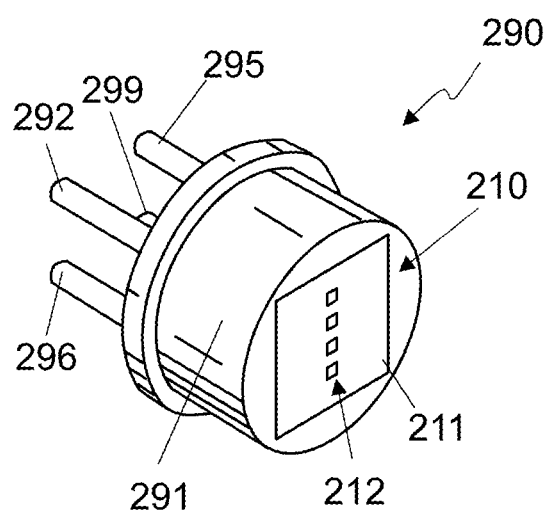
FIG. 2C is an isometric view of an embodiment of a packaged version of the linear array of detector elements of FIG. 2A.

FIG. 2C is an isometric view of an embodiment of a packaged version 290 of the linear array of detector elements of the infrared detector 210 of FIG. 2A. The packaged version 290 includes a package 291, such as a standard TO-5 metal housing or some other type of packaging, with the substrate 211 of the infrared detector 210 mounted inside of the package 291 behind a mid-IR-transmissive window (or window/filter) in a way to allow external mid-IR electromagnetic energy to affect the substrate 211 of the infrared detector 210 while at the same time shielding the substrate 211 from non-mid-IR influences. The packaged version 290 includes at least one terminal 292-299 accessible from outside of the package. The packaged version 290 of this embodiment includes circuitry, mounted in the package 291 and coupled between the detector elements 212 of the infrared detector 210 and the at least one output terminal 292-299. In some embodiments, the circuitry simply provides electrical connectivity between the detector elements 212 and the at least one terminal 292-299. In other embodiments, the circuitry can detect the electrical characteristic of the detector elements 212 that is affected by infrared radiation and convert that into a signal that is provided on at least one of the output terminals 292-299. Examples of electronic circuitry that may be included in an embodiment of the packaged infrared detector 290 include voltage buffers/amplifiers and/or analog-to-digital converters (ADC). In at least one embodiment, the output terminal 295 is a power input and the output terminal 299 is a ground terminal for the electronic circuitry which includes an ADC. A clock input for the ADC may be coupled to the output terminal 292 and the output of the ADC is coupled to the output terminal 296. Many other embodiments of a packaged infrared detector 290 are also possible, as can be determined by one of ordinary skill.

Figure 3A:
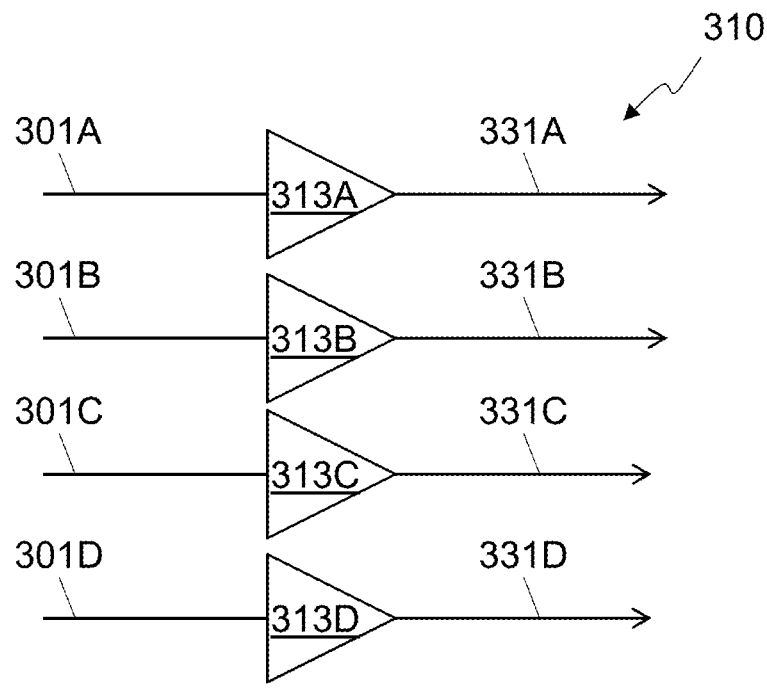
FIG. 3A-B show embodiments of circuitry for receiving signals from a linear array of detector elements.

FIG. 3A shows a first embodiment of circuitry 310 for receiving signals from a linear array of detector elements. The circuitry 310 could be integrated into the packaged infrared detector 290 in embodiments. A first line 301A that has a voltage based on infrared radiation incident on the first detector element is coupled to a first transistor buffer 313A to create a buffered version 331A of the first detector element output. A second line 301B that has a voltage based on infrared radiation incident on the second detector element is coupled to a second transistor buffer 313B to create a buffered version 331B of the second detector element output. A third line 301C that has a voltage based on infrared radiation incident on the third detector element is coupled to a third transistor buffer 313C to create a buffered version 331C of the third detector element output. A fourth line 301D that has a voltage based on infrared radiation incident on the fourth detector element is coupled to a fourth transistor buffer 313D to create a buffered version 331D of the fourth detector element output. With this architecture, there is a one-to-one correspondence between the detector elements of the linear array, and transistor buffers.

Figure 3B:
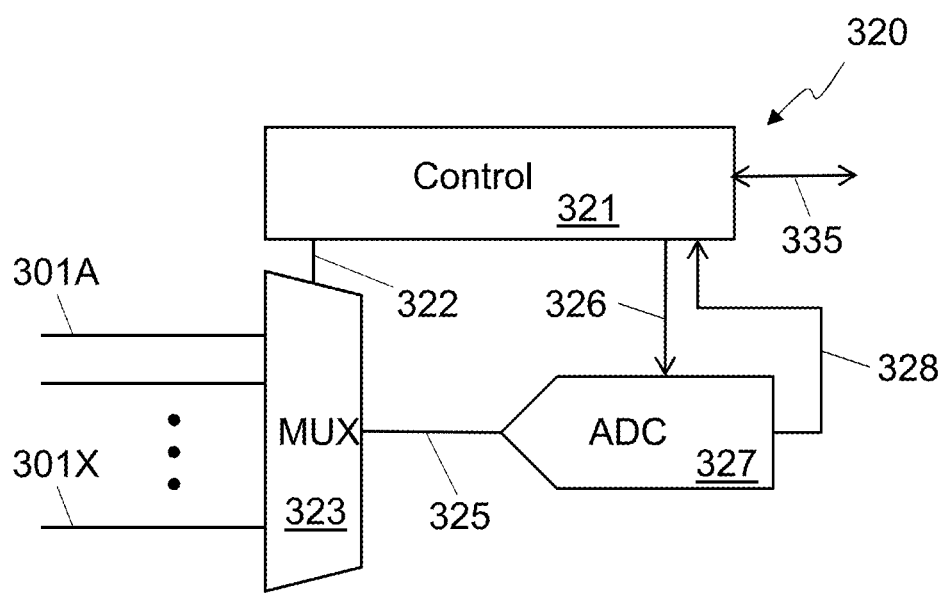

FIG. 3B shows a second embodiment of circuitry 320 for receiving signals from a linear array of detector elements. The circuitry 320 could be integrated into the packaged infrared detector 290 in embodiments. The circuitry 320 includes control circuitry 321 with an output 322 coupled to an analog multiplexer 323 to select one of the inputs 301A-X to provide as an input 325 to an analog-to-digital converter (ADC) 327. The ADC 327 can have any resolution, depending on the embodiment, but the ADC 327 is a monotonic 14 bit ADC in at least one embodiment. The control circuitry 321 also controls the ADC 327 using one or more control lines 326, and the output 328 of the ADC 327 is made available at the at least one output terminal 335.

In some embodiments, the control circuitry 321 includes one or more control lines coupled to external control terminals of the package, with the output of the ADC 328 directly available on external terminals, but in the embodiment shown, the control circuitry 321 receives the output 328 of the ADC 327 and communicates over a bidirectional input/output (I/O) line 335. Any protocol can be used on the I/O line 335, such as I²C, originally developed by Phillips Semiconductor, a derivate of I²C such as SMBus or ACCESS bus, Universal Serial Bus (USB), or any other appropriate serial interface. Other embodiments may use different protocols to transfer the digital information on one or more lines. Some embodiments may include multiple ADCs and multiple outputs to allow for faster and/or simpler access to the digital information.

Figure 4A:
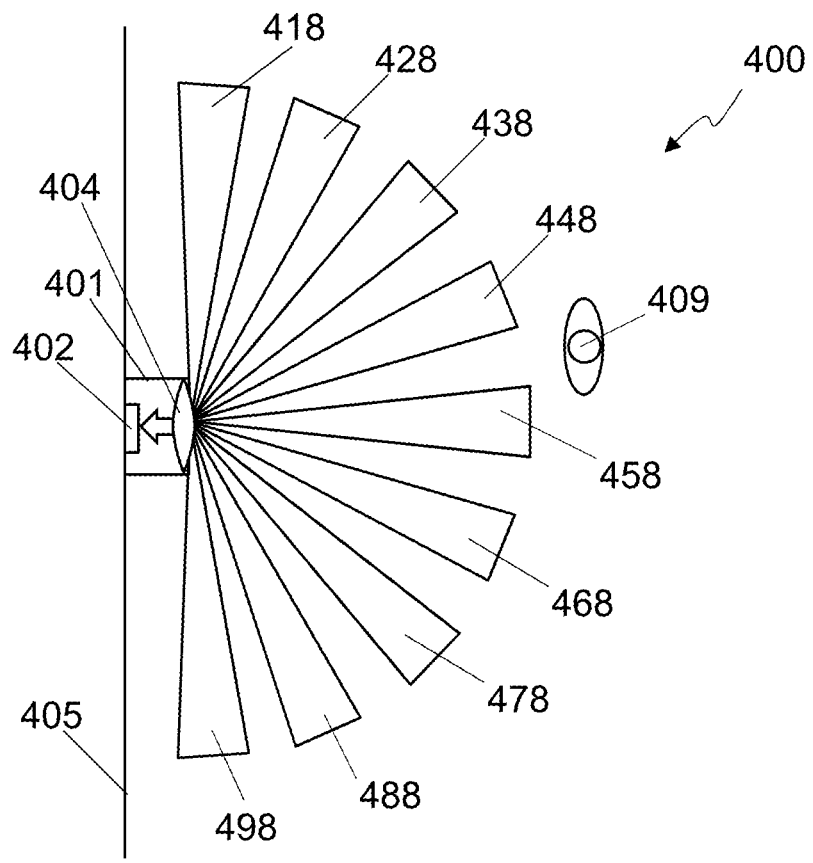
FIG. 4A-B show a top view and a cross-sectional side view, respectively, of an embodiment of monitored volumes for a motion sensor in a room.
Figure 4B:
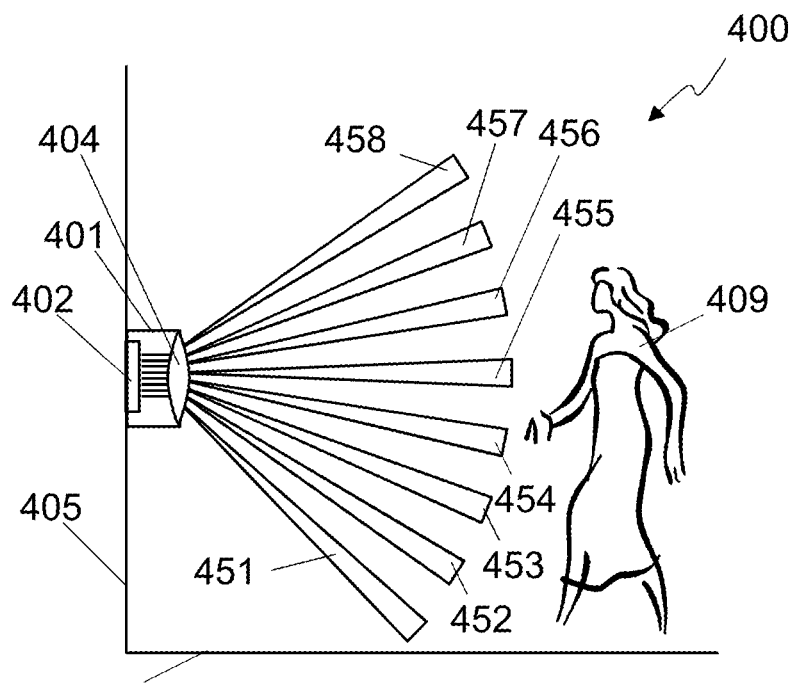
Figure 4C:
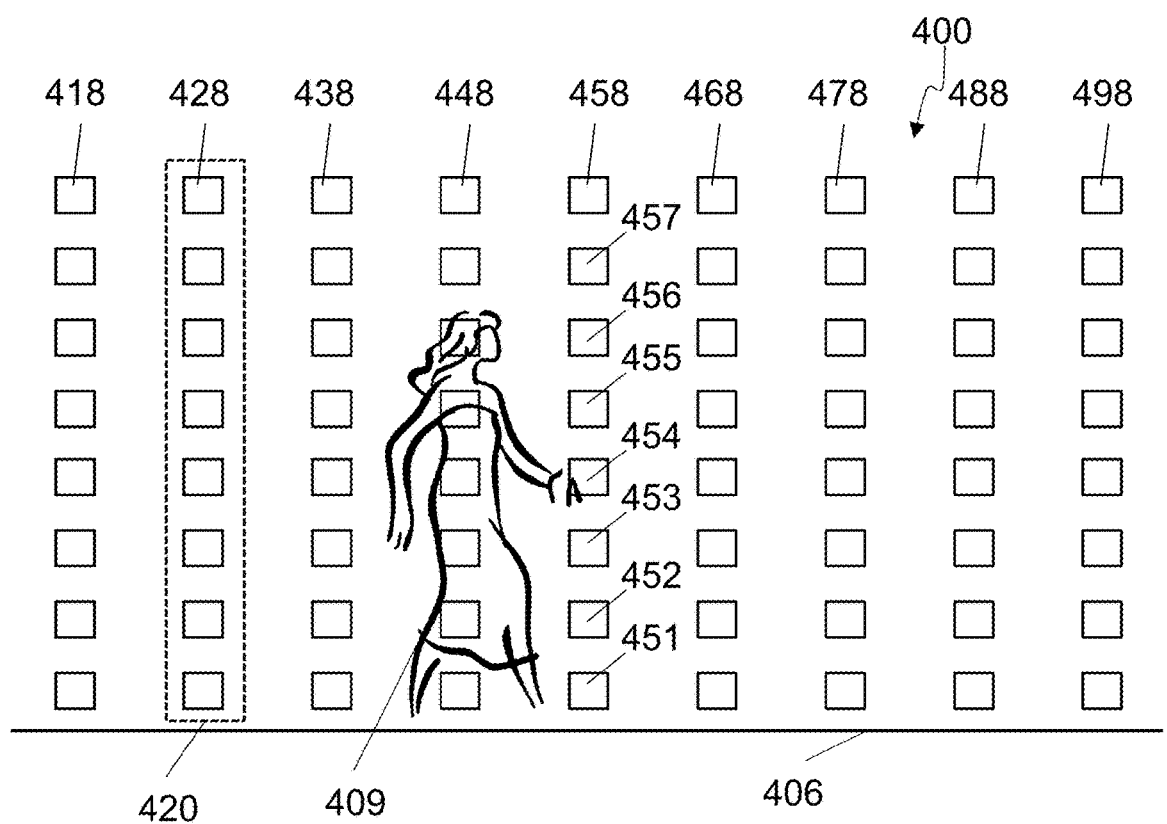
FIG. 4C shows the monitored volumes of FIG. 4A-B projected onto a human.

FIG. 4A-B show a top view and a cross-sectional side view, respectively, of an embodiment of monitored volumes for a motion sensor 401 in a detection space 400, which may be a room or a portion of a room that includes the two or more curtains of monitored volumes. The room 400 with the detection space has a wall 405 and a floor 406. FIG. 4C shows the monitored volumes of FIG. 4A-B projected onto a human 409 walking through the detection space 400. FIG. 4C shows a flattened cylindrical surface centered around the motion detector 410. While there may be some distortion of the monitored volumes near the top and bottom in actual implementations, the monitored volumes are shown in FIG. 4C with consistent sizes and shapes for clarity.

The motion sensor 401 is mounted on the wall 405 and includes an infrared detector 402 with a linear array of detector elements. An optical system 404 simultaneously directs infrared radiation from two or more curtains of monitored volumes onto the linear array of detector elements of the infrared detector 402. Embodiments can have any number of monitored volumes in a curtain. Some embodiments may use the optical system to direct multiple monitored volumes of a single curtain onto a single detector element. The embodiment shown in FIG. 4A-C, however, has an infrared detector 402 with 8 detector elements in a linear array and has 8 monitored volumes in each curtain. So in some embodiments, the linear array consists of a first number of the individual detector elements and a single curtain of the two or more curtains of monitored volumes consists of the first number of the monitored volumes. While the embodiment shown in FIG. 4A-C has 9 curtains covering an azimuth angle of about 180°, various embodiments can have any number of curtains. In some embodiments, the two or more curtains of the monitored volumes have 5 to 17 individual curtains of the monitored volumes spanning an azimuth angle of 60 to 200 degrees, with each individual curtain of the monitored volumes having 4 to 32 monitored volumes spanning an elevation angle of 45 to 135 degrees.

As can be seen in FIG. 4C, the curtains of monitored volumes, such as the second curtain 420, have a vertical orientation. So in some embodiments, the two or more curtains of the monitored volumes have a tilt angle from a vertical orientation of the infrared sensor 401 of between 0 and 5 degrees, which is defined to be substantially vertical for the purposes of this disclosure. In FIG. 4A and FIG. 4C, the top monitored volume of each curtain can be seen, including the top monitored volume 418 of the first curtain, the top monitored volume 428 of the second curtain, the top monitored volume 438 of the third curtain, the top monitored volume 448 of the fourth curtain, the top monitored volume 458 of the fifth curtain, the top monitored volume 468 of the sixth curtain, the top monitored volume 478 of the seventh curtain, the top monitored volume 488 of the eighth curtain, and the top monitored volume 498 of the ninth curtain. These 9 monitored volumes constitute the eighth row of monitored volumes in this embodiment. In FIG. 4B and FIG. 4C, the fifth curtain of monitored volumes can be seen, including the first monitored volume 451, the second monitored volume 452, the third monitored volume 453, the fourth monitored volume 454, the fifth monitored volume 455, the sixth monitored volume 456, the seventh monitored volume 457, and the eighth monitored volume 458, showing that there are 8 monitored volumes in each curtain and 8 rows of monitored volumes in this embodiment.

FIG. 4C shows that the human 409 is substantially intercepting the second, third, fourth, fifth and sixth monitored volume of the fourth curtain of monitored volumes. As the human 409 moved from the left to the right into their current position, the signals from the second, third, fourth, fifth and sixth detector elements indicated that the human 409 was moving into and out of monitored volumes associated with those detector elements. The changes to those signals were processed by electronic circuitry to determine that a human 409 was moving through the detection space 400 so that an indication of that could be provided.

Figure 5:
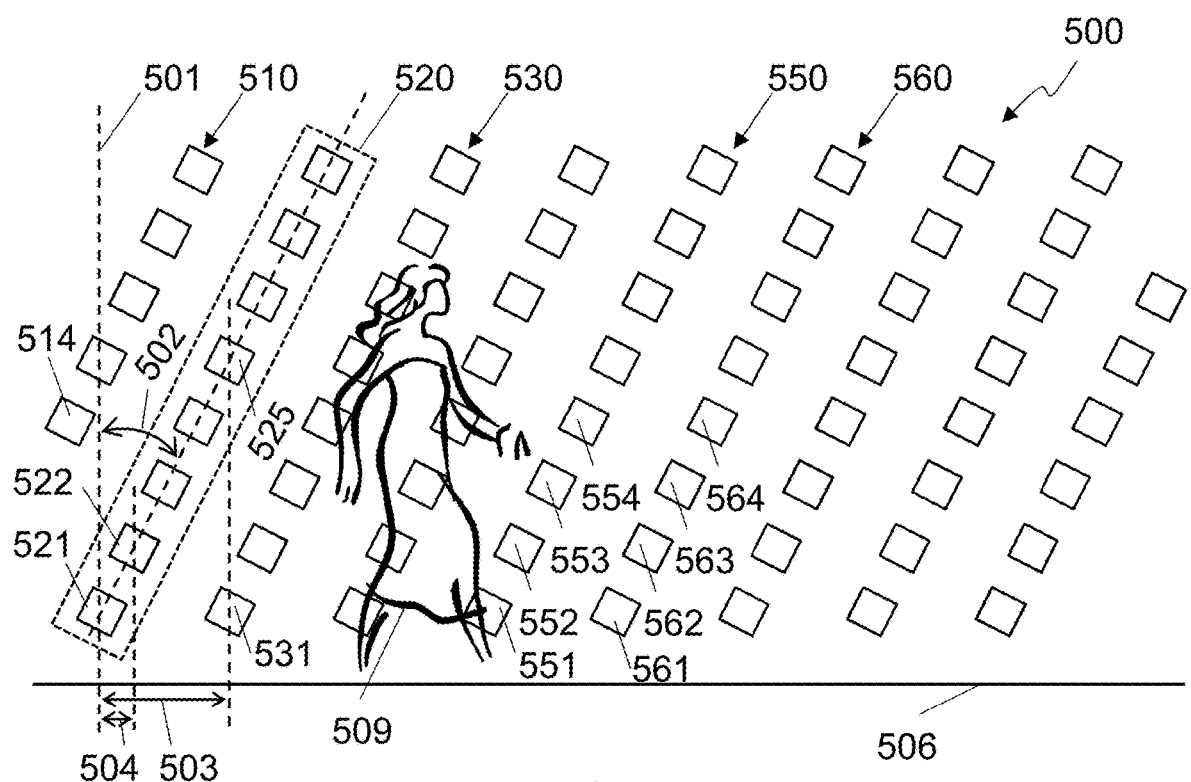
FIG. 5 shows an embodiment with tilted curtains of monitored volumes projected onto a human.

FIG. 5 shows an embodiment with tilted curtains of monitored volumes projected onto a human 509 in a detection space 500. FIG. 5 shows a flattened cylindrical surface centered around a motion detector. While there may be some distortion of the monitored volumes near the top and bottom in actual implementations, the monitored volumes are shown in FIG. 5 with consistent sizes and shapes for clarity.

The detection space 500 includes two or more curtains of monitored volumes (in this case 9 curtains of monitored volumes), including a second curtain 520 of monitored volumes. In the embodiment shown, each curtain includes 8 monitored volumes. Other embodiments may have any number of curtains with any number of monitored volumes in each curtain. A motion sensor (not shown) is located at an edge of the detection space 500. The motion sensor includes an infrared detector having a single linear array of detector elements disposed on a substrate, and an optical system to simultaneously direct electromagnetic energy from two or more curtains of monitored volumes onto the linear array of detector elements. The two or more curtains of the monitored volumes have a tilt angle 502 from a vertical orientation 501 of the motion sensor. The tilt angle can be determined for a particular embodiment based on the size and spacing of the monitored volumes in a curtain and the spacing between the curtains, but the tilt angle may be between 5 and 80 degrees in many embodiments. The tilt angle of the monitored volumes can be achieved by mounting the infrared sensor in the motion detector with the array of detector elements at the tilt angle from a vertical orientation of the motion sensor. Alternatively, the infrared sensor may be mounted within the infrared sensor with the linear array parallel to the vertical orientation of the infrared sensor with the optical system providing for the tilt angle of the two or more curtains of the monitored volumes. Other embodiments may use a combination of the two techniques or any other technique to provide the tilt angle to the curtains of monitored volumes.

The motion sensor creates the two or more curtains of the monitored volumes at the tilt angle 502 as shown in the detection space 500. A top view of the detection space 500 would look similar to FIG. 4A, although the tilt angle would allow for the some of the lower monitored volumes of each curtain to be seen. A cross-sectional side view of the detection space 500 would look similar to FIG. 4B if the cross-sectional plane were to be tilted at the tilt angle.

The detection space 500 includes a fifth curtain 550 of the monitored volumes adjacent to a sixth curtain 560 of the monitored volumes. The fifth curtain 550 of the monitored volumes includes a first monitored volume 551 optically coupled to a first individual detector element of the array of detector elements, a second monitored volume 552 optically coupled to a second individual detector element of the array of detector elements, a third monitored volume 553 optically coupled to a third individual detector element of the array of detector elements, and a fourth monitored volume 554 optically coupled to a fourth individual detector element of the array of detector elements. The first monitored volume 551, the second monitored volume 552, the third monitored volume 553 and the fourth monitored volume 554 are disposed equidistantly within the fifth curtain 550 of the monitored volumes.

The sixth curtain 560 of the monitored volumes includes a fifth monitored volume 561 optically coupled to the first individual detector element of the array of detector elements, a sixth monitored volume 562 optically coupled to the second individual detector element of the array of detector elements, a seventh monitored volume 563 optically coupled to the third individual detector element of the array of detector elements, and an eighth monitored volume 564 optically coupled to the fourth individual detector element of the array of detector elements. The fifth monitored volume 561, the sixth monitored volume 562, the seventh monitored volume 563 and the eighth monitored volume 564 are disposed equidistantly within the second curtain 560 of the monitored volumes.

A separation between the fifth curtain 550 of the monitored volumes and the sixth curtain 560 of the monitored volumes positions a center of the fifth monitored volume 561 at a period distance from a center of the first monitored volume 551, and the tilt angle 502 positions a center of the second monitored volume 552 at at a horizontal distance from the center of the first monitored volume 551 that is about equal to one quarter of the period distance. This is referred to herein as a quadrature horizontal spatial relationship. Note that distances can be measured on a plane that is perpendicular to one of the monitored volumes included in the measurement, or on a flattened cylindrical surface centered on the motion detector. The quadrature horizontal spatial relationship can be more clearly shown using the second curtain 520 and third curtain 530 due to clutter in FIG. 5 around the fifth curtain 550 and sixth curtain 560. The spacing 503 between the curtains of the detection space 500 can be referred to as the period distance. This can be measured as the distance between centers of any two monitored volumes in the same row of adjacent curtains, such as the distance 503 between the center of the first monitored volume 521 of the second curtain 520 and the center of the first monitored volume 531 of the third curtain 530. The tilt angle 502 is selected so that the horizontal distance between centers of adjacent monitored volumes of the same curtain is one quarter of the period distance. This can be seen as the horizontal distance 504 between the center of the first monitored volume 521 and the center of the second monitored volume 522 of the second curtain 520. Note that with this arrangement, the fifth monitored volume 525 of the second curtain 520 is horizontally aligned with the first monitored volume 531 of the third curtain 530.

The same physical configuration can be alternatively described as the two or more curtains of the monitored volumes having a tilt angle 502 from vertical 501 to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element, wherein the linear array of the detector elements includes the first detector element, the second detector element, the third detector element, and the fourth detector element. The two or more curtains of the monitored volumes include the first row of monitored volumes, the second row of monitored volumes, the third row of monitored volumes and the fourth row of monitored volumes.

As the human 509 moves through the detection space 500, electrical signals are generated by the detector elements of the linear array of detector elements of the infrared detector in the motion sensor. Because all of the monitored volumes of a single row are coupled to a single detector element of the linear array, each time the human 509 passes through a monitored volume of a row, the electrical signal from the detector element associated with that row shows activity. A set of electrical signals processed by the motion sensor include a first signal coupled to the first detector element, a second signal coupled to the second detector element, a third signal coupled to the third detector element, and a fourth signal coupled to the fourth detector element.

Figure 6:
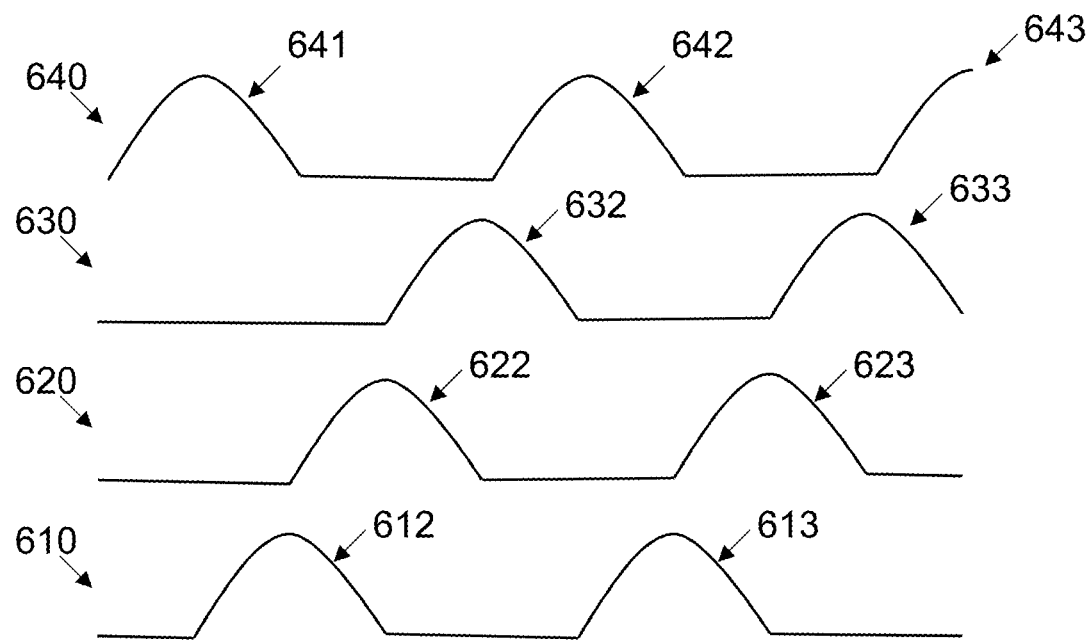
FIG. 6 shows example electrical signals generated by detector elements in an embodiment of a motion sensor.

FIG. 6 shows example electrical signals generated by detector elements in an embodiment of a motion sensor that creates a monitored space 500 as shown in FIG. 5. Four signals are shown, a first signal 610 generated by the first detector element of the array which is associated with a first row of monitored volumes of the curtains of monitored volumes, a second signal 620 generated by the second detector element of the array which is associated with a second row of monitored volumes of the curtains of monitored volumes, a third signal 630 generated by the third detector element of the array which is associated with a third row of monitored volumes of the curtains of monitored volumes, and a fourth signal 640 generated by the fourth detector element of the array which is associated with a fourth row of monitored volumes of the curtains of monitored volumes. The x-axis of FIG. 5 is time.

As an example, if the human 509 moves through the detection space 500 from left to right, the first monitored volume to detect the heat coming from the human 509 may be the fourth monitored volume 514 of the first curtain 510 which generates a first activity 641 on the fourth signal 640. Ignoring the monitored volumes in the fifth through the eighth rows of monitored volumes for now, the next monitored volume to detect the heat coming from the moving human 509 is the first monitored volume 521 of the second curtain 520 which generates a second activity 612 on the first signal 610, followed by heat detection by the second monitored volume 522 of the second curtain 520 which generates a third activity 622 on the second signal 620, then heat detection by the third monitored volume of the second curtain 520 which generates a fourth activity 632 on the third signal 630, and heat detection by the fourth monitored volume of the second curtain 520 which generates a fifth activity 642 on the fourth signal 640. Then the human 509 progressively enters the first monitored volume 531 of the third curtain 530 which generates a sixth activity 613 on the first signal 610, the second monitored volume of the third curtain 530 which generates a seventh activity 623 on the second signal 620, the third monitored volume of the third curtain 530 which generates an eighth activity 633 on the third signal 630, and the fourth monitored volume of the third curtain 530 which generates a ninth activity 643 on the fourth signal 640.

As the human 509 moves toward the right, she moves progressively through the first four monitored volumes of each curtain. She also moves out of the various monitored volumes in the same order that she entered them. If the human 509 moves through the detection space 500 at a constant rate, this generates a quadrature phase relationship between the four signals 610, 620, 630, 640, with each signal being 90° out of phase with its adjacent signals. A direction of the movement of the human 509 can be detected by looking at the relative phase of the signals. If the human 509 is moving in the direction of the tilt of the curtains, that is from left to right in the example detection space 500, the phase of a signal from a row of detector elements will lag the phase of the signal from the next lower row of detector elements as shown in FIG. 6. If the human 509 is moving in the direction opposite of the tilt of the curtains, that is from right to left in the example detection space 500, the phase of a signal from a row of detector elements will lead the phase of the signal from the next lower row of detector elements.

Figure 7:
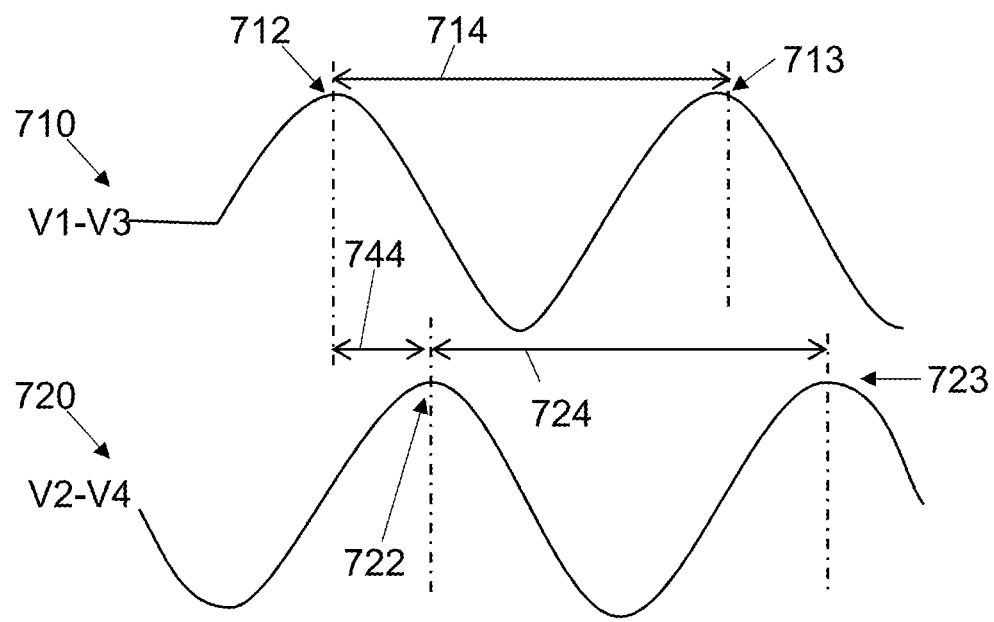
FIG. 7 shows example quadrature waveforms from an embodiment of a motion sensor.

FIG. 7 shows example quadrature waveforms 710, 720 from an embodiment of a motion sensor. FIG. 7 shows intermediate processing performed in some embodiments of the signals shown in FIG. 6 with time as the x-axis. A first composite signal 710 is created by subtracting the third signal 630 from the first signal 610, and a second composite signal 720 is created by subtracting the fourth signal 640 from the second signal 620. The first composite signal 710 has a first peak 712 and a second peak 713, providing a first period 714 of the first composite signal 710. The second composite signal 720 has a first peak 722 and a second peak 723, providing a second period 724 of the second composite signal 720. Because the human 509 is moving through the detection space at an approximately constant rate, the first period 714 is approximately the same as the second period 724. This allows a composite phase relationship to be determined between the first composite signal 710 and the second composite signal 720.

The composite phase relationship can be determined by measuring the peak-to-peak delay 744 between the first peak 712 of the first composite signal 710 and the first peak 722 of the second composite signal 720 and multiplying a ratio of the delay 744 to the period 714, 724 by 360° to calculate the composite phase relationship in degrees. A quadrature phase relationship may be determined if a magnitude of the composite phase relationship is between 70 and 110 degrees. A sign (e.g positive or negative) of the composite phase relationship, normalized between −180° and 180°, is used in some embodiments, to determine a direction of movement by the human 509 in the detection space 500. An indication that the human 509 was detected can be provided based on a quadrature phase relationship of the composite signals 710, 720, and in some cases, the direction of the movement is also included in the indication.

In some embodiments additional processing is performed on one or more additional signals of the set of electrical signals that are received. The one or more additional signals are associated with one or more additional detector elements included in the linear array of the detector elements and one or more additional rows of monitored volumes of the two or more curtains of monitored volumes are respectively associated with the one or more additional detector elements. For example, infrared radiation from the fifth row of monitored volumes shown in FIG. 5 may be projected onto a fifth detector element of the linear array of detector elements which generate a fifth signal based on incident infrared radiation. The second signal from the second detector element, the third signal from the third detector element, the fourth signal from the fourth detector element, and the fifth signal from the fifth detector element may then be processed as described to determine a phase relationship between the four signals. If a quadrature phase relationship is determined, then an indication that a human was detected may be generated, even if no quadrature phase relationship was determined for the first, second, third, and fourth signals. The processing may be repeated any number of times with any set of four signals that are generated by four detector elements associated with four monitored volumes that have a quadrature horizontal spatial relationship. Thus, in some embodiments, a second quadrature phase relationship may be detected between four signals of the set of electrical signals, the four signals including an additional signal associated with an additional detector element of the linear array of detector elements, wherein the additional signal is not the first signal, the second signal, the third signal, or the fourth signal, and the indication may be provided based on detecting the first quadrature phase relationship and/or the second quadrature phase relationship.

Many different sets of four signals may be processed to determine quadrature phase relationships, depending on the embodiment. For example in the example shown in FIG. 5 with 8 detector elements generating 8 signals, there are 5 different sets of 4 signals that are each associated with monitored volumes having a quadrature horizontal spatial relationship. The four sets are listed here with just a number indicating the signal: 1234, 2345, 3456, 4567, and 5678. In another embodiment using the infrared detector 220 having 32 detector elements and used in a motion sensor, the monitored volumes of every fourth detector element have the quadrature horizontal spatial relationship so that there are a like number (3 in this example) of the additional detector elements that are included in the linear array of the detector elements between the first detector element and the second detector element, between the second detector element and the third detector element, and between the third detector element and the fourth detector element, where the first detector element, the second detector element, the third detector element, and the fourth detector element are selected for processing. In this case there are 20 different combinations of signals that are possible, with a list (using A-Z and 1-6 to represent the 32 signals) shown here: AEIM, BFJN, CGKO, DHLP, EIMQ, FJNR, GKOS, HLPT, IMQU, JNRV, KOSW, LPTX, MQUY, NRVZ, OSW1, PTX2, QUY3, RVZ4, SW15, TX26. In addition, pairs of adjacent signals may be combined to effectively increase the size of the monitored volumes while still maintaining the quadrature horizontal spatial relationship. Three examples of the 8 signals that may be used in this fashion to generate 4 combined signals are AB/EF/IJ/MN, and CD/GH/KL/OP, and RS/VW/Z1/45. Another possible combination would combine three adjacent signals together to create even larger effective monitored volumes while maintaining the quadrature horizontal spatial relationship, such as ABC/EFG/IJK/MNO.

Figure 8:
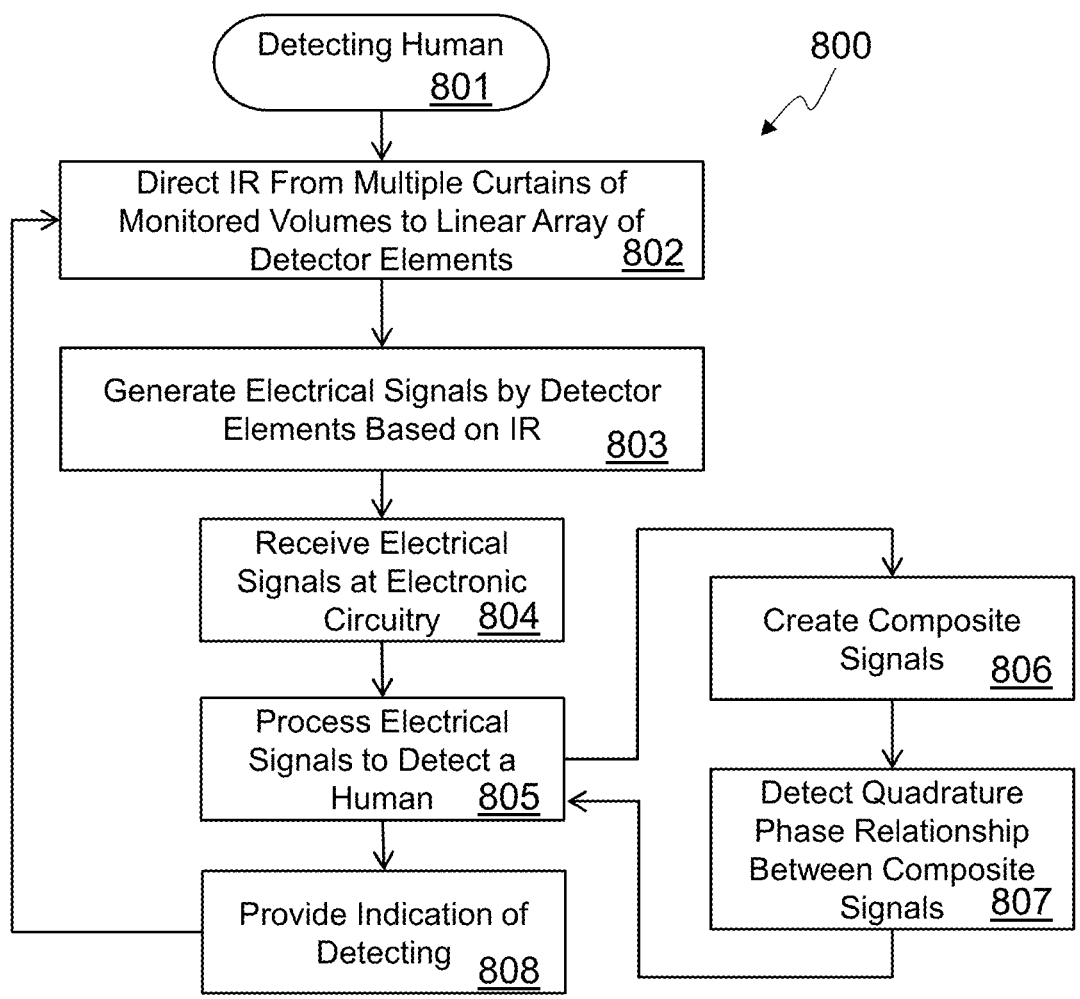
FIG. 8 shows a flow chart of an embodiment of a method to detect a human.

FIG. 8 shows a flow chart 800 of an embodiment of a method to detect a human which starts at block 801. The method includes simultaneously directing infrared radiation from multiple curtains of monitored volumes to a linear array of detector elements at block 802. The curtains of monitored volumes may be tilted from vertical in some embodiments. A set of electrical signals are generated by the detector elements based on their incident infrared radiation at block 803.

The method continues at block 804 by receiving the set of electrical signals respectively representative of a level of infrared radiation incident on a linear array of detector elements, the infrared radiation simultaneously directed from two or more curtains of monitored volumes onto the linear array of the detector elements by an optical system. The set of electrical signals are processed using electronic circuitry to detect a human located in a detection space that includes the two or more curtains of monitored volumes at block 805, and an indication of the detecting is provided at block 808. In some embodiments, the detecting includes determining that the human is moving through the detection space. In some embodiments, the detecting includes determining that the human is occupying a position in the detection space. In at least one embodiment the detecting includes determining at a first time that at least one of the electrical signals indicates that a first warm body was detected but that the first warm body was not tall enough to be the human, and determining at a second time that more than one of the electrical signals indicates that second warm body was detected and that the second warm body is the human.

In some embodiments, where the two or more curtains of monitored volumes are disposed at a tilt angle from vertical, the method includes, at block 806, creating a first composite signal by subtracting a third signal of the set of electrical signals from a first signal of the set of electrical signals, and creating a second composite signal by subtracting a fourth signal of the set of electrical signals from a second signal of the set of electrical signals. A block 807 a composite phase relationship between the first composite signal and the second composite signal is determined and a quadrature phase relationship between the composite signals is detected if a magnitude of the composite phase relationship is between 70 and 110 degrees. The method may also include determining a direction of movement by the human in the detection space based on a sign of the composite phase relationship and denoting the direction of movement by the human in the indication, thus, the detecting includes determining a direction of movement by the human through the detection space.

Another example embodiment for a method for detecting motion includes receiving a set of electrical signals at electronic circuitry, and detecting a quadrature phase relationship between a first signal, a second signal, a third signal, and a fourth signal by processing the set of electrical signals using electronic circuitry. An indication is then provided that a human was detected in a detection space that includes the two or more curtains of monitored volumes in response to detecting the quadrature phase relationship.

In the system used by the embodiment for a method for detecting motion described in the previous paragraph, electrical properties of the electrical signals are respectively based on infrared radiation incident on a linear array of detector elements that is simultaneously directed from two or more curtains of monitored volumes onto the linear array of the detector elements by an optical system. The two or more curtains of the monitored volumes have a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element. The linear array of the detector elements comprise the first detector element, the second detector element, the third detector element, and the fourth detector element. The two or more curtains of the monitored volumes comprise the first row of monitored volumes, the second row of monitored volumes, the third row of monitored volumes and the fourth row of monitored volumes, and the set of electrical signals comprise a first signal coupled to the first detector element, a second signal coupled to the second detector element, a third signal coupled to the third detector element, and a fourth signal coupled to the fourth detector element.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems or circuitry that perform the specified functions or acts, or combinations of special purpose hardware, circuitry, and computer instructions.

As will be appreciated by those of ordinary skill in the art, aspects of the various embodiments may be embodied as a system, device, method, or computer program product apparatus. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more non-transitory computer readable medium(s) having computer program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described in the following paragraphs:

Embodiment 1

An infrared sensor comprising: an infrared detector having a single linear array of detector elements disposed on a substrate, an electrical characteristic of an individual detector element of the linear array of detector elements reactive to a level of infrared radiation incident on the individual detector element; and an optical system to simultaneously direct electromagnetic energy from two or more curtains of monitored volumes onto the linear array of detector elements.

Embodiment 2

The infrared sensor of embodiment 1, wherein the individual detector element comprises a bolometer, a thermocouple, a thermopile, a semiconductor charge-coupled device (CCD), or a complementary metal-oxide-semiconductor (CMOS) sensor.

Embodiment 3

The infrared sensor of embodiment 1 or 2, further comprising a filter that attenuates at least some of the electromagnetic energy incident to the individual detector element having a wavelength outside of a range of 6 to 14 microns.

Embodiment 4

The infrared sensor of any of embodiments 1-3, wherein the linear array consists of a first number of the individual detector elements, and a single curtain of the two or more curtains of monitored volumes consists of the first number of the monitored volumes.

Embodiment 5

The infrared sensor of any of embodiments 1-4, wherein the linear array comprises 4 or more detector elements.

Embodiment 6

The infrared sensor of any of embodiments 1-5, wherein the two or more curtains of the monitored volumes have a tilt angle from a vertical orientation of the infrared sensor of between 0 and 5 degrees.

Embodiment 7

The infrared sensor of any of embodiments 1-5, wherein the two or more curtains of the monitored volumes have a tilt angle from a vertical orientation of the infrared sensor of between 5 and 80 degrees.

Embodiment 8

The infrared sensor of embodiment 7, wherein the tilt angle creates a quadrature horizontal spatial relationship between rows of the monitored volumes included in the two or more curtains of the monitored volumes.

Embodiment 9

The infrared sensor of embodiment 7 or 8, wherein the infrared detector is mounted within the infrared sensor with the linear array at the tilt angle.

Embodiment 10

The infrared sensor of embodiment 7 or 8, wherein the infrared detector is mounted within the infrared sensor with the linear array parallel to the vertical orientation of the infrared sensor, and the optical system provides the tilt angle of the two or more curtains of the monitored volumes.

Embodiment 11

The infrared sensor of any of embodiments 7-10, the two or more curtains of the monitored volumes comprising a first curtain of the monitored volumes adjacent to a second curtain of the monitored volumes; the first curtain of the monitored volumes comprising a first monitored volume optically coupled with a first individual detector element of the array of detector elements, a second monitored volume optically coupled with a second individual detector element of the array of detector elements, a third monitored volume optically coupled with a third individual detector element of the array of detector elements, and a fourth monitored volume optically coupled with a fourth individual detector element of the array of detector elements, the first monitored volume, the second monitored volume, the third monitored volume, and the fourth monitored volume disposed equidistantly within the first curtain of the monitored volumes; the second curtain of the monitored volumes comprising a fifth monitored volume optically coupled with the first individual detector element of the array of detector elements, a sixth monitored volume optically coupled with the second individual detector element of the array of detector elements, a seventh monitored volume optically coupled with the third individual detector element of the array of detector elements, an and eighth monitored volume optically coupled with the fourth individual detector element of the array of detector elements, the fifth monitored volume, the sixth monitored volume, the seventh monitored volume, and the eighth monitored volume disposed equidistantly within the second curtain of the monitored volumes; wherein a separation between the first curtain of the monitored volumes and the second curtain of the monitored volumes positions a center of the fifth monitored volume at a period distance from a center of the first monitored volume, and the tilt angle positions a center of the second monitored volume at a horizontal distance from the center of the first monitored volume that is about equal to one quarter of the period distance.

Embodiment 12

The infrared sensor of embodiment 11, the two or more curtains of the monitored volumes comprising 5 to 17 individual curtains of the monitored volumes spanning an azimuth angle of 60 to 200 degrees, each individual curtain of the monitored volumes comprising 4 to 32 monitored volumes spanning an elevation angle of 45 to 135 degrees.

Embodiment 13

The infrared sensor of embodiment 11 or 12, further comprising electronic circuitry to generate an indication of a direction of movement of a human moving through a detection space that includes the two or more curtains of monitored volumes.

Embodiment 14

The infrared sensor of any of embodiments 1-13, further comprising electronic circuitry to generate an indication that a human is occupying a detection space that includes the two or more curtains of monitored volumes.

Embodiment 15

The infrared sensor of any of embodiments 1-14, further comprising electronic circuitry to generate an indication that a human is moving through a detection space that includes the two or more curtains of monitored volumes.

Embodiment 16

The infrared sensor of any of embodiments 1-15, further comprising electronic circuitry to generate a first indication in response to a human moving through a detection space that includes the two or more curtains of monitored volumes and a second indication in response to lack of the human occupying the detection space, wherein no indication is generated in response to a small animal moving through or occupying the detection space.

Embodiment 17

A motion sensor comprising: an infrared detector having a single linear array of detector elements disposed on a substrate; and an optical system to simultaneously direct electromagnetic energy from two or more curtains of monitored volumes onto the linear array of detector elements, the two or more curtains of the monitored volumes having a tilt angle from a vertical orientation of the motion sensor of between 5 and 80 degrees.

Embodiment 18

The motion sensor of embodiment 17, wherein an individual detector element of the single linear array of the detector elements comprises a pyroelectric detector, a piezoelectric detector, a bolometer, a thermocouple, a thermopile, a semiconductor charge-coupled device (CCD), or a complementary metal-oxide-semiconductor (CMOS) sensor.

Embodiment 19

The motion sensor of embodiment 17 or 18, further comprising a filter that attenuates at least some of the electromagnetic energy incident to the single linear array of the detector elements having a wavelength outside of a range of 6 to 14 microns.

Embodiment 20

The motion sensor of any of embodiments 17-19, wherein the linear array consists of a first number of the detector elements, and a single curtain of the two or more curtains of monitored volumes consists of the first number of the monitored volumes.

Embodiment 21

The motion sensor of any of embodiments 17-20, wherein the linear array comprises 4 or more detector elements.

Embodiment 22

The motion sensor of any of embodiments 17-21, wherein the tilt angle creates a quadrature horizontal spatial relationship between rows of the monitored volumes included in the two or more curtains of the monitored volumes.

Embodiment 23

The motion sensor of any of embodiments 17-22, wherein the infrared detector is mounted within the motion sensor with the linear array at the tilt angle.

Embodiment 24

The motion sensor of any of embodiments 17-22, wherein the infrared detector is mounted within the motion sensor with the linear array parallel to the vertical orientation of the motion sensor, and the optical system provides the tilt angle of the two or more curtains of the monitored volumes.

Embodiment 25

The motion sensor of any of embodiments 17-24, the two or more curtains of the monitored volumes comprising a first curtain of the monitored volumes adjacent to a second curtain of the monitored volumes; the first curtain of the monitored volumes comprising a first monitored volume optically coupled with a first individual detector element of the array of detector elements, a second monitored volume optically coupled with a second individual detector element of the array of detector elements, a third monitored volume optically coupled with a third individual detector element of the array of detector elements, and a fourth monitored volume optically coupled with a fourth individual detector element of the array of detector elements, the first monitored volume, the second monitored volume, the third monitored volume, and the fourth monitored volume disposed equidistantly within the first curtain of the monitored volumes; the second curtain of the monitored volumes comprising a fifth monitored volume optically coupled with the first individual detector element of the array of detector elements, a sixth monitored volume optically coupled with the second individual detector element of the array of detector elements, a seventh monitored volume optically coupled with the third individual detector element of the array of detector elements, and an eighth monitored volume optically coupled with the fourth individual detector element of the array of detector elements, the fifth monitored volume, the sixth monitored volume, the seventh monitored volume, and the eighth monitored volume disposed equidistantly within the second curtain of the monitored volumes; wherein a separation between the first curtain of the monitored volumes and the second curtain of the monitored volumes positions a center of the fifth monitored volume at a period distance from a center of the first monitored volume, and the tilt angle positions a center of the second monitored volume at a horizontal distance from the center of the first monitored volume that is about equal to one quarter of the period distance.

Embodiment 26

The motion sensor of embodiment 25, the two or more curtains of the monitored volumes comprising 5 to 17 individual curtains of the monitored volumes spanning an azimuth angle of 60 to 200 degrees, each individual curtain of the monitored volumes comprising 4 to 32 monitored volumes spanning an elevation angle of 45 to 135 degrees.

Embodiment 27

The motion sensor of any of embodiments 17-26, further comprising electronic circuitry to generate an indication of a direction of movement of a human moving through a detection space that includes the two or more curtains of monitored volumes.

Embodiment 28

The motion sensor of any of embodiments 17-27, further comprising electronic circuitry to generate an indication that a human is occupying a detection space that includes the two or more curtains of monitored volumes.

Embodiment 29

The motion sensor of any of embodiments 17-28, further comprising electronic circuitry to generate an indication that a human is moving through a detection space that includes the two or more curtains of monitored volumes.

Embodiment 30

The motion sensor of any of embodiments 17-29, further comprising electronic circuitry to generate a first indication in response to a human moving through a detection space that includes the two or more curtains of monitored volumes, wherein no indication is generated in response to a small animal moving through or occupying the detection space.

Embodiment 31

A method for detecting a human, the method comprising: receiving a set of electrical signals respectively representative of a level of infrared radiation incident on a linear array of detector elements, the infrared radiation simultaneously directed from two or more curtains of monitored volumes onto the linear array of the detector elements by an optical system; detecting a human located in a detection space that includes the two or more curtains of monitored volumes by processing the set of the electrical signals using electronic circuitry; and providing an indication of the detecting.

Embodiment 32

The method of embodiment 31, the detecting comprising determining that the human is moving through the detection space.

Embodiment 33

The method of embodiment 31 or 32, the detecting comprising determining that the human is occupying a position in the detection space.

Embodiment 34

The method of any of embodiments 31-33, the detector elements of the array of detector elements comprising a bolometer, a thermocouple, a thermopile, a semiconductor charge-coupled device (CCD), or a complementary metal-oxide-semiconductor (CMOS) sensor.

Embodiment 35

The method of any of embodiments 31-34, the detecting comprising determining at a first time that at least one of the electrical signals of the set of the electrical signals indicates that a first warm body was detected but that the first warm body was not tall enough to be the human, and determining at a second time that more than one of the electrical signals of the set of the electrical signals indicates that second warm body was detected and that the second warm body is the human.

Embodiment 36

The method of any of embodiments 31-35, the detecting comprising determining a direction of movement by the human through the detection space, wherein the two or more curtains of monitored volumes are disposed at a tilt angle from vertical.

Embodiment 37

A method for detecting motion, the method comprising: receiving a set of electrical signals at electronic circuitry, electrical properties of the set of the electrical signals respectively based on infrared radiation incident on a linear array of detector elements, the infrared radiation simultaneously directed from two or more curtains of monitored volumes onto the linear array of the detector elements by an optical system, and the two or more curtains of the monitored volumes having a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element, wherein the linear array of the detector elements comprise the first detector element, the second detector element, the third detector element, and the fourth detector element, the two or more curtains of the monitored volumes comprise the first row of monitored volumes, the second row of monitored volumes, the third row of monitored volumes, and the fourth row of monitored volumes, and the set of the electrical signals comprise a first signal coupled to the first detector element, a second signal coupled to the second detector element, a third signal coupled to the third detector element, and a fourth signal coupled to the fourth detector element; detecting a quadrature phase relationship between the first signal, the second signal, the third signal, and the fourth signal by processing the set of the electrical signals using electronic circuitry; and providing an indication that a human was detected in a detection space that includes the two or more curtains of monitored volumes in response to detecting the quadrature phase relationship.

Embodiment 38

The method of embodiment 37, wherein the detector elements of the array of the detector elements comprise a pyroelectric infrared detector, a piezoelectric detector, a bolometer, a thermocouple, a thermopile, a semiconductor charge-coupled device (CCD), or a complementary metal-oxide-semiconductor (CMOS) sensor.

Embodiment 39

The method of embodiment 37 or 38, further comprising: determining a direction of movement by the human in the detection space; the indication further denoting the direction of the movement by the human.

Embodiment 40

The method of any of embodiments 37-39, further comprising: creating a first composite signal by subtracting the third signal from the first signal; creating a second composite signal by subtracting the fourth signal from the second signal; determining a composite phase relationship between the first composite signal and the second composite signal; and detecting the quadrature phase relationship if a magnitude of the composite phase relationship is between 70 and 110 degrees.

Embodiment 41

The method of embodiment 40, further comprising: determining a direction of movement by the human in the detection space based on a sign of the composite phase relationship; the indication further denoting the direction of the movement by the human.

Embodiment 42

The method of any of embodiments 37-40, further comprising: receiving one or more additional signals of the set of electrical signals; wherein the one or more additional signals are associated with one or more additional detector elements included in the linear array of the detector elements; and one or more additional rows of monitored volumes of the two or more curtains of monitored volumes are respectively associated with the one or more additional detector elements.

Embodiment 43

The method of embodiment 42, wherein a like number of the additional detector elements are included in the linear array of the detector elements between the first detector element and the second detector element, between the second detector element and the third detector element, and between the third detector element and the fourth detector element.

Embodiment 44

The method of embodiment 42 or 43, further comprising: detecting a second quadrature phase relationship between four signals of the set of electrical signals, the four signals including an additional signal associated with an additional detector element of the linear array of detector elements, wherein the additional signal is not the first signal, the second signal, the third signal, or the fourth signal; and providing the indication based on detecting the first quadrature phase relationship and/or the second quadrature phase relationship.

Embodiment 45

At least one machine readable medium comprising one or more instructions that in response to being executed on a computing device cause the computing device to carry out a method according to any one of embodiments 31 to 44.

Embodiment 46

A computer program product for detecting motion, the computer program product comprising: at least one non-transitory computer readable storage medium having computer readable program code embodied therewith, the computer readable program code comprising: computer readable program code to receive a set of electrical signals at electronic circuitry, electrical properties of the set of the electrical signals respectively based on infrared radiation incident on a linear array of detector elements, the infrared radiation simultaneously directed from two or more curtains of monitored volumes onto the linear array of the detector elements by an optical system, and the two or more curtains of the monitored volumes having a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element, wherein the linear array of the detector elements comprise the first detector element, the second detector element, the third detector element, and the fourth detector element, the two or more curtains of the monitored volumes comprise the first row of monitored volumes, the second row of monitored volumes, the third row of monitored volumes, and the fourth row of monitored volumes, and the set of the electrical signals comprise a first signal coupled to the first detector element, a second signal coupled to the second detector element, a third signal coupled to the third detector element, and a fourth signal coupled to the fourth detector element; computer readable program code to detect a quadrature phase relationship between the first signal, the second signal, the third signal, and the fourth signal by processing the set of the electrical signals using electronic circuitry; and computer readable program code to provide an indication that a human was detected in a detection space that includes the two or more curtains of monitored volumes in response to detecting the quadrature phase relationship.

Embodiment 47

The computer program product of embodiment 46, the computer readable program code further comprising: computer readable program code to determine a direction of movement by the human in the detection space; and computer readable program code to include, in the indication, the direction of the movement by the human.

Embodiment 48

The computer program product of embodiment 46 or 47, the computer readable program code further comprising: computer readable program code to create a first composite signal by subtracting the third signal from the first signal; computer readable program code to creating a second composite signal by subtracting the fourth signal from the second signal; computer readable program code to determine a composite phase relationship between the first composite signal and the second composite signal; and computer readable program code to detect the quadrature phase relationship if a magnitude of the composite phase relationship is between 70 and 110 degrees.

Embodiment 49

The computer program product of embodiment 48, further comprising: computer readable program code to determine a direction of movement by the human in the detection space based on a sign of the composite phase relationship; and computer readable program code to include, in the indication, the direction of the movement by the human.

Embodiment 50

The computer program product of any of embodiments 46-49, the computer readable program code further comprising: computer readable program code to detect a second quadrature phase relationship between four signals of the set of electrical signals. the four signals including an additional signal associated with an additional detector element of the linear array of detector elements, wherein the additional signal is not the first electrical signal, the second electrical signal, the third electrical signal, or the fourth electrical; and computer readable program code to provide the indication based on detecting the first quadrature phase relationship and/or the second quadrature phase relationship.

Embodiment 51

A motion sensor comprising: an infrared detector having a single linear array of at least four detector elements disposed on a substrate; and an optical system to simultaneously direct electromagnetic energy from two or more curtains of monitored volumes onto the linear array of detector elements, the two or more curtains of the monitored volumes having a tilt angle from a vertical orientation of the motion sensor of between 5 and 80 degrees.

Embodiment 52

The motion sensor of embodiment 51, wherein an individual detector element of the single linear array of the at least four detector elements comprises a pyroelectric detector, a piezoelectric detector, a bolometer, a thermocouple, a thermopile, a semiconductor charge-coupled device (CCD), or a complementary metal-oxide-semiconductor (CMOS) sensor.

Embodiment 53

The motion sensor of embodiment 51 or 52, wherein the single linear array of the at least four detector elements consists of a first number of individual detector elements, and a single curtain of the two or more curtains of monitored volumes consists of the first number of the monitored volumes.

Embodiment 54

The motion sensor of any of embodiments 51 through 53, wherein the infrared detector is mounted within the motion sensor with the linear array at the tilt angle.

Embodiment 55

The motion sensor of any of embodiments 51 through 53, wherein the infrared detector is mounted within the motion sensor with the linear array parallel to the vertical orientation of the motion sensor, and the optical system provides the tilt angle of the two or more curtains of the monitored volumes.

Embodiment 56

The motion sensor of any of embodiments 51 through 55, the two or more curtains of the monitored volumes comprising a first curtain of the monitored volumes adjacent to a second curtain of the monitored volumes; the first curtain of the monitored volumes comprising a first monitored volume optically coupled with a first individual detector element of the array of detector elements, a second monitored volume optically coupled with a second individual detector element of the array of detector elements, a third monitored volume optically coupled with a third individual detector element of the array of detector elements, and a fourth monitored volume optically coupled with a fourth individual detector element of the array of detector elements, the first monitored volume, the second monitored volume, the third monitored volume, and the fourth monitored volume disposed equidistantly within the first curtain of the monitored volumes; the second curtain of the monitored volumes comprising a fifth monitored volume optically coupled with the first individual detector element of the array of detector elements, a sixth monitored volume optically coupled with the second individual detector element of the array of detector elements, a seventh monitored volume optically coupled with the third individual detector element of the array of detector elements, and an eighth monitored volume optically coupled with the fourth individual detector element of the array of detector elements, the fifth monitored volume, the sixth monitored volume, the seventh monitored volume, and the eighth monitored volume disposed equidistantly within the second curtain of the monitored volumes; wherein a separation between the first curtain of the monitored volumes and the second curtain of the monitored volumes positions a center of the fifth monitored volume at a period distance from a center of the first monitored volume, and the tilt angle positions a center of the second monitored volume at a horizontal distance from the center of the first monitored volume that is about equal to one quarter of the period distance.

Embodiment 57

The motion sensor of embodiments 51 through 56, further comprising electronic circuitry to generate an indication that a human is occupying or moving through a detection space that includes the two or more curtains of monitored volumes, wherein no indication is generated in response to a small animal moving through or occupying the detection space.

Embodiment 58

A method for detecting motion, the method comprising: receiving a set of electrical signals at electronic circuitry, electrical properties of the set of the electrical signals respectively based on infrared radiation incident on a linear array of detector elements, the infrared radiation simultaneously directed from two or more curtains of monitored volumes onto the linear array of the detector elements by an optical system, and the two or more curtains of the monitored volumes having a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element, wherein the linear array of the detector elements comprise the first detector element, the second detector element, the third detector element, and the fourth detector element, the two or more curtains of the monitored volumes comprise the first row of monitored volumes, the second row of monitored volumes, the third row of monitored volumes, and the fourth row of monitored volumes, and the set of the electrical signals comprise a first signal coupled to the first detector element, a second signal coupled to the second detector element, a third signal coupled to the third detector element, and a fourth signal coupled to the fourth detector element; detecting a quadrature phase relationship between the first signal, the second signal, the third signal, and the fourth signal by processing the set of electrical signals using electronic circuitry; and providing an indication that a human was detected in a detection space that includes the two or more curtains of monitored volumes in response to detecting the quadrature phase relationship.

Embodiment 59

The method of embodiment 58, wherein the detector elements of the array of detector elements comprise a pyroelectric infrared detector, a piezoelectric detector, a bolometer, a thermocouple, a thermopile, a semiconductor charge-coupled device (CCD), or a complementary metal-oxide-semiconductor (CMOS) sensor.

Embodiment 60

The method of embodiment 58 or 59, further comprising: creating a first composite signal by subtracting the third signal from the first signal; creating a second composite signal by subtracting the fourth signal from the second signal; determining a composite phase relationship between the first composite signal and the second composite signal; and detecting the quadrature phase relationship if a magnitude of the composite phase relationship is between 70 and 110 degrees.

Embodiment 61

The method of embodiment 60, further comprising: determining a direction of movement by the human in the detection space based on a sign of the composite phase relationship; the indication further denoting the direction of the movement by the human.

Embodiment 62

The method of any of embodiments 58 through 61, further comprising: receiving one or more additional signals of the set of electrical signals; wherein the one or more additional signals are associated with one or more additional detector elements included in the linear array of the detector elements; and one or more additional rows of monitored volumes of the two or more curtains of monitored volumes are respectively associated with the one or more additional detector elements.

Embodiment 63

The method of embodiment 62, wherein a like number of the additional detector elements are included in the linear array of the detector elements between the first detector element and the second detector element, between the second detector element and the third detector element, and between the third detector element and the fourth detector element.

Embodiment 64

The method of embodiment 62 or 63, further comprising: detecting a second quadrature phase relationship between four signals of the set of electrical signals, the four signals including an additional signal associated with an additional detector element of the linear array of detector elements, wherein the additional signal is not the first signal, the second signal, the third signal, or the fourth signal; and providing the indication based on detecting the first quadrature phase relationship and/or the second quadrature phase relationship.

Embodiment 65

At least one machine readable medium comprising one or more instructions that in response to being executed on a computing device cause the computing device to carry out a method according to any one of embodiments 58 to 64.

Any combination of elements included in embodiments 1-65 may be used in an embodiment.

As used in this specification and the appended claims, the singular forms "a", "an", and "the" include plural referents unless the content clearly dictates otherwise. Thus, for example, reference to an element described as "a monitored volume" may refer to a single monitored volume, two monitored volumes, or any other number of monitored volumes. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Unless otherwise indicated, all numbers expressing quantities of elements, percentages, and so forth used in the specification and claims are to be understood as being modified in all instances by the term "about." Interpretation of the term "about" is context specific, but in the absence of other indications, should generally be interpreted as ±10% of the modified quantity, measurement, or distance. The recitation of numerical ranges by endpoints includes all numbers subsumed within that range (e.g. 1 to 5 includes 1, 2.78, 3.3̄3̄, and 5). Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A method for detecting motion, the method comprising:
receiving a set of electrical signals at electronic circuitry, electrical properties of the set of the electrical signals respectively based on infrared radiation incident on a linear array of detector elements,
the infrared radiation simultaneously directed from two or more curtains of monitored volumes onto the linear array of the detector elements by an optical system, and
the two or more curtains of the monitored volumes having a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element,
wherein the linear array of the detector elements comprise the first detector element, the second detector element, the third detector element, and the fourth detector element,
the two or more curtains of the monitored volumes comprise the first row of monitored volumes, the second row of monitored volumes, the third row of monitored volumes, and the fourth row of monitored volumes, and
the set of the electrical signals comprise a first signal coupled to the first detector element, a second signal coupled to the second detector element, a third signal coupled to the third detector element, and a fourth signal coupled to the fourth detector element;
detecting a quadrature phase relationship between the first signal, the second signal, the third signal, and the fourth signal by processing the set of the electrical signals using electronic circuitry; and
providing an indication that a human was detected in a detection space that includes the two or more curtains of monitored volumes in response to detecting the quadrature phase relationship.

2. The method of claim 1, further comprising:
determining a direction of movement by the human in the detection space;
the indication further denoting the direction of the movement by the human.

3. The method of claim 1, further comprising:
creating a first composite signal by subtracting the third signal from the first signal;
creating a second composite signal by subtracting the fourth signal from the second signal;
determining a composite phase relationship between the first composite signal and the second composite signal; and
detecting the quadrature phase relationship if a magnitude of the composite phase relationship is between 70 and 110 degrees.

4. The method of claim 3, further comprising:
determining a direction of movement by the human in the detection space based on a sign of the composite phase relationship;
the indication further denoting the direction of the movement by the human.

5. The method of claim 1, further comprising:
receiving one or more additional signals of the set of electrical signals;
wherein the one or more additional signals are associated with one or more additional detector elements included in the linear array of the detector elements; and
one or more additional rows of monitored volumes of the two or more curtains of monitored volumes are respectively associated with the one or more additional detector element.

6. The method of claim 1, further comprising:
detecting a second quadrature phase relationship between four signals of the set of electrical signals, the four signals including an additional signal associated with an additional detector element of the linear array of detector elements, wherein the additional signal is not the first signal, the second signal, the third signal, or the fourth signal; and
providing the indication based on detecting the first quadrature phase relationship and/or the second quadrature phase relationship.

7. The method of claim 1, wherein the detector elements of the array of the detector elements comprise a pyroelectric infrared detector, a piezoelectric detector, a bolometer, a thermocouple, a thermopile, a semiconductor charge-coupled device (CCD), or a complementary metal-oxide-semiconductor (CMOS) sensor.

8. An article of manufacture comprising at least one non-transitory computer readable storage medium having instructions stored thereon, the instructions, as executed by a processing device, result in a method comprising:
receiving a set of electrical signals at electronic circuitry, electrical properties of the set of the electrical signals respectively based on infrared radiation incident on a linear array of detector elements,
the infrared radiation simultaneously directed from two or more curtains of monitored volumes onto the linear array of the detector elements by an optical system, and
the two or more curtains of the monitored volumes having a tilt angle from vertical to create a quadrature horizontal spatial relationship between a first row of monitored volumes associated with a first detector element, a second row of monitored volumes associated with a second detector element, a third row of monitored volumes associated with a third detector element, and a fourth row of monitored volumes associated with a fourth detector element, wherein the linear array of the detector elements comprise the first detector element, the second detector element, the third detector element, and the fourth detector element, the two or more curtains of the monitored volumes comprise the first row of monitored volumes, the second row of monitored volumes, the third row of monitored volumes, and the fourth row of monitored volumes, and the set of the electrical signals comprise a first signal coupled to the first detector element, a second signal coupled to the second detector element, a third signal coupled to the third detector element, and a fourth signal coupled to the fourth detector element;

detecting a quadrature phase relationship between the first signal, the second signal, the third signal, and the fourth signal by processing the set of the electrical signals using electronic circuitry; and providing an indication that a human was detected in a detection space that includes the two or more curtains of monitored volumes in response to detecting the quadrature phase relationship.

9. The article of manufacture of claim 8, the method further comprising:

determining a direction of movement by the human in the detection space;

the indication further denoting the direction of the movement by the human.

10. The article of manufacture of claim 8, the method further comprising:

creating a first composite signal by subtracting the third signal from the first signal;

creating a second composite signal by subtracting the fourth signal from the second signal;

determining a composite phase relationship between the first composite signal and the second composite signal; and detecting the quadrature phase relationship if a magnitude of the composite phase relationship is between 70 and 110 degrees.

11. The article of manufacture of claim 10, the method further comprising:

determining a direction of movement by the human in the detection space based on a sign of the composite phase relationship;

the indication further denoting the direction of the movement by the human.

12. The article of manufacture of claim 8, the method further comprising:

detecting a second quadrature phase relationship between four signals of the set of electrical signals, the four signals including an additional signal associated with an additional detector element of the linear array of detector elements, wherein the additional signal is not the first signal, the second signal, the third signal, or the fourth signal; and providing the indication based on detecting the first quadrature phase relationship and/or the second quadrature phase relationship.

13. The article of manufacture of claim 8, the method further comprising:

receiving one or more additional signals of the set of electrical signals;

wherein the one or more additional signals are associated with one or more additional detector elements included in the linear array of the detector elements; and one or more additional rows of monitored volumes of the two or more curtains of monitored volumes are respectively associated with the one or more additional detector element.

14. The article of manufacture of claim 12, wherein a like number of the one or more additional detector elements are included in the linear array of the detector elements between the first detector element and the second detector element, between the second detector element and the third detector element, and between the third detector element and the fourth detector element.

15. The method of claim 4, wherein a like number of the one or more additional detector elements are included in the linear array of the detector elements between the first detector element and the second detector element, between the second detector element and the third detector element, and between the third detector element and the fourth detector element.

* * * * *